US012181907B2

(12) United States Patent
Cowling et al.

(10) Patent No.: US 12,181,907 B2
(45) Date of Patent: Dec. 31, 2024

(54) FOUR-AXIS MECHANICAL CONTROLLER

(71) Applicant: Skyryse, Inc., El Segundo, CA (US)

(72) Inventors: David Anthony Cowling, Bath (GB); David James Manzanares, Snohomish, WA (US); Gonzalo Javier Rey, Torrence, CA (US)

(73) Assignee: Skyryse, Inc., El Segundo, CA (US)

( * ) Notice: Subject to any disclaimer, the term of this patent is extended or adjusted under 35 U.S.C. 154(b) by 306 days.

(21) Appl. No.: 17/715,316

(22) Filed: Apr. 7, 2022

(65) Prior Publication Data

US 2022/0326727 A1 Oct. 13, 2022

Related U.S. Application Data

(60) Provisional application No. 63/172,474, filed on Apr. 8, 2021.

(51) Int. Cl.
*G05G 9/047* (2006.01)
*G05G 5/03* (2008.04)

(52) U.S. Cl.
CPC ............... *G05G 9/047* (2013.01); *G05G 5/03* (2013.01); *G05G 2009/04718* (2013.01);
(Continued)

(58) Field of Classification Search
CPC ......... G05G 9/047; G05G 2009/04718; G05G 2009/04733
See application file for complete search history.

(56) References Cited

U.S. PATENT DOCUMENTS 3,095,754 A * 7/1963 Mayon .................... G05G 9/047 74/495
5,002,241 A * 3/1991 Tizac .................. B64C 13/0421 244/237

(Continued)

FOREIGN PATENT DOCUMENTS

EP 1736846 A1 * 12/2006 ........... F16H 59/044
WO WO-0039783 A1 * 7/2000 ............. G05G 9/047
WO WO-2021038935 A1 * 3/2021

OTHER PUBLICATIONS

PCT International Search Report and Written Opinion, PCT Application No. PCT/US2022/023846, Aug. 3, 2022, 22 pages.

(Continued)

*Primary Examiner* — Daniel D Yabut
(74) *Attorney, Agent, or Firm* — Fenwick & West LLP

(57) ABSTRACT

A mechanical controller provides four-axis control of a vehicle's position and movement. For example, the controller provides control of a vehicle's operations through a lateral axis, longitudinal axis, directional axis, and a grip axis (e.g., operating a thumbwheel of the mechanical controller that provides additional control inputs to the vehicle). The mechanical controller can provide independent force feel mechanisms in each of the lateral, longitudinal, and directional axes of movement. Additionally, the mechanical controller may provide a redundant force feel mechanism (e.g., for increased safety). For example, redundant springs and dampers may be incorporated in each axis's force feel mechanism. The mechanical controller may include a plunger and spring assembly to provide a force feel mechanism in the lateral and longitudinal axes. In addition to this spring force, surfaces of a contact region between the plunger and a plunger actuating plate may be shaped to produce force feel characteristics.

20 Claims, 16 Drawing Sheets

(52) U.S. Cl.
CPC ............. *G05G 2009/04729* (2013.01); *G05G 2009/04748* (2013.01); *G05G 2009/04751* (2013.01); *G05G 2009/04762* (2013.01); *G05G 2009/04766* (2013.01); *G05G 2009/04774* (2013.01)

(56) References Cited

U.S. PATENT DOCUMENTS

| | | | | |
|---|---|---|---|---|
| 2010/0011897 | A1* | 1/2010 | Kopp | F16F 1/14 74/471 XY |
| 2014/0208881 | A1* | 7/2014 | Voiles | G05G 5/05 74/471 XY |
| 2015/0158575 | A1* | 6/2015 | Buoy | G05G 9/047 74/471 XY |
| 2018/0095492 | A1 | 4/2018 | Matloff | |
| 2020/0348714 | A1 | 11/2020 | Ofenloch et al. | |
| 2020/0398980 | A1* | 12/2020 | Abdelli | B64C 27/56 |
| 2022/0011807 | A1* | 1/2022 | Carton | G05G 9/047 |

OTHER PUBLICATIONS

Sorrento, G. U. et al. "Assessment of Joystick Control During the Performance of Powered Wheelchair Driving Tasks." Journal of Neuroengineering and Rehabilitation, vol. 8, No. 31, May 24, 2011, pp. 1-11.

* cited by examiner

FOUR-AXIS MECHANICAL CONTROLLER

CROSS REFERENCE TO RELATED APPLICATIONS

This application claims the benefit of U.S. Provisional Application No. 63/172,474, filed Apr. 8, 2021, which is incorporated by reference herein in its entirety.

TECHNICAL FIELD

The disclosure generally relates to the field of vehicle control systems, and particularly to a mechanical controller.

BACKGROUND

Forces and accuracy specified for vehicle control (e.g., aircraft control) are higher than would be expected in game controllers or industrial controllers. This is often because the operating environment may be subject to vibration and buffeting, which necessitates a more precise positioning feel. Conventional control sticks are relatively large and limited in movement between forward, backward, and side-to-side due to the inclusion of springs for force feel mechanisms in each direction of movement. Furthermore, conventional control sticks are unable to integrate fail-operational mechanisms (e.g., in order to prevent loss of life and/or damage to property in the event of a failure) while having a reduced form factor. Thus, the conventional designs for vehicle control are not only more complex as compared to a gaming or industrial system's design, but are bulkier and complicated by the number of components included to support force feel mechanisms.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure

DETAILED DESCRIPTION

Figure 1:
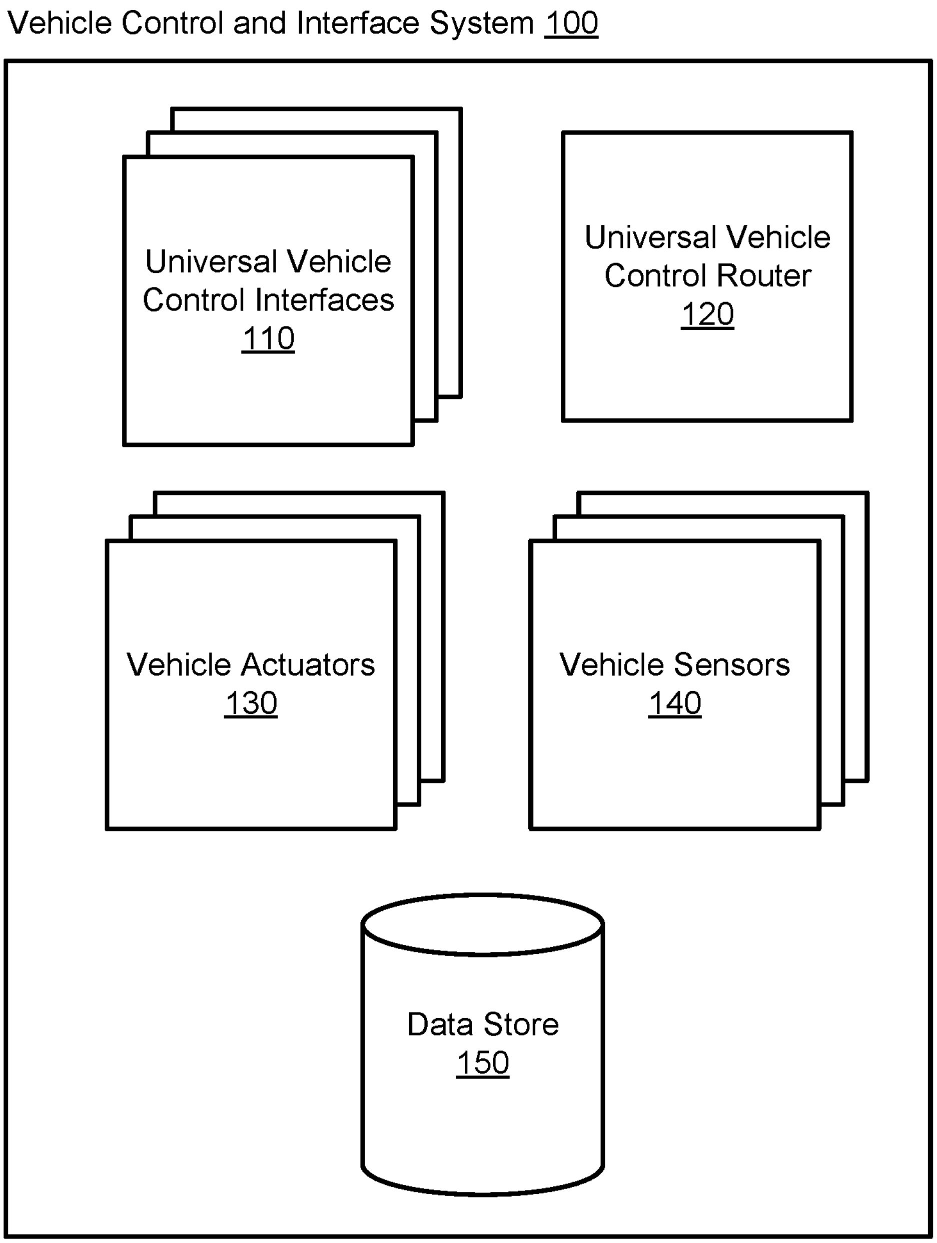
(FIG. 1 is a block diagram of a vehicle control and interface system, in accordance with one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A mechanical controller is described herein that provides four-axis control of a vehicle's position and movement. In one example, the axes are a lateral axis, longitudinal axis, directional axis, and a grip axis (e.g., a user's thumb operating a thumbwheel of the mechanical controller that provides additional control inputs to the vehicle). The mechanical controller can provide independent force feel mechanisms in each of the lateral, longitudinal, and directional axes of movement. In addition, in applications where safety requirements call for high integrity in the force feel or centering of the stick, the mechanical controller may provide a redundant force feel mechanism. For example, redundant springs and dampers may be incorporated in each axis's force feel mechanism. Examples of mechanical controllers include sidesticks or center sticks (e.g., for aircraft controllers).

The mechanical controller may enable a force feel mechanism for the longitudinal and lateral axes by a single spring. This can allow for a reduced form factor relative to a conventional control stick that includes springs for force feel mechanisms of each direction of movement. In addition to this advantage of reducing the number of parts, the mechanical controller may decrease the complexity and size of a gimbal used to facilitate movement of the mechanical controller. By locating the gimbal above a plunger coupled to the aforementioned single spring, the gimbal's complexity and size are reduced. The location of the gimbal relative to the plunger is thus such that the gimbal is further proximal to the operator's hand than the plunger (i.e., the plunger is located further distally from the grip than the gimbal mechanism is located). In some embodiments, the plunger is both separately located and of generally larger diameter than the gimbal mounted above the plunger. The plunger can incorporate redundant concentric springs, which may simplify the packaging (e.g., increasing utilization of the space otherwise occupied by a single spring). The space in the center of the plunger within the springs may also be able to be used by a damper system (e.g., to reduce free oscillation of the mechanical controller).

In one embodiment, a mechanical controller is configured to provide control input to a vehicle control system. The control system may be for a vehicle or a vehicle simulator. The mechanical controller includes a shaft, a gimbal mechanism, one or more sensors, and a force feel mechanism. The mechanical controller may further include an enclosure that houses the gimbal mechanism and force feel mechanism. The shaft rotates about a directional axis and may be connected to a grip. The gimbal mechanism includes a gimbal and support bearings that hold the shaft. The gimbal mechanism the shaft to move along a longitudinal axis and a lateral axis. The shaft rotates about the directional axis within the gimbal mechanism. The one or more sensors may be coupled to the gimbal mechanism and can be configured to capture data describing the displacement or the rotation of the shaft. The force feel mechanism is also coupled to the gimbal mechanism and includes a plunger coupled to a spring assembly. The force feel mechanism also includes a plunger actuating plate coupled to the plunger (e.g., coupled by a pressing contacting between the plunger actuating plate and an upper surface of the plunger). The contact region at which the plunger actuating plate is configured to contact the plunger can be shaped such that movement of the shaft along the lateral axis has a first resistance, or a first set of resistances, and movement of the shaft along the longitudinal axis has a second resistance, or a second set of resistances, that is different than the first resistance. In some embodiments, the plunger actuating plate includes a central flat region and regions extending away from the central flat region that are flat in either the longitudinal or lateral direction. These regions extending away from the central flat region may narrow in width as a function of distance away from the central flat region. The plunger actuating plate may additionally or alternatively be shaped such that its surface profile is based on a set of offset ellipses, which allows the plunger actuating plate to form a breakout.

Example System Environment

Figure (FIG. 1 illustrates one example embodiment of a vehicle control and interface system 100. In the example embodiment shown, the vehicle control and interface system 100 includes one or more universal vehicle control interfaces 110, a universal vehicle control router 120, one or more vehicle actuators 130, one or more vehicle sensors 140, and one or more data stores 150. In other embodiments, the vehicle control and interface system 100 may include different or additional elements. Furthermore, the functionality may be distributed among the elements in a different manner than described. The elements of FIG. 1 may include one or more computers that communicate via a network or other suitable communication method.

The vehicle control and interface system 100 may be integrated with various vehicles having different mechanical, hardware, or software components. For example, the vehicle control and interface system 100 may be integrated with fixed-wing aircraft (e.g., airplanes), rotorcraft (e.g., helicopters), motor vehicles (e.g., automobiles), watercraft (e.g., power boats or submarines), or any other suitable vehicle. The vehicle control and interface system 100 is advantageously configured to receive inputs for requested operation of a particular vehicle via universal set of interfaces and the inputs to appropriate instructions for mechanical, hardware, or software components of the particular vehicle to achieve the requested operation. In doing so, the vehicle control and interface system 100 enables human operators to operate different vehicles using the same universal set of interfaces or inputs. By way of example, "universal" indicates that a feature of the vehicle control and interface system 100 may operate or be architected in a vehicle-agnostic manner. This allows for vehicle integration without necessarily having to design and configure vehicle specific customizations or reconfigurations in order to integrate the specific feature. Although universal features of the vehicle control and interface system 100 can function in a vehicle-agnostic manner, the universal features may still be configured for particular contexts. For example, the vehicle control or interface system 100 may receive or process inputs describing three-dimensional movements for vehicles that can move in three dimensions (e.g., aircraft) and conversely may receive or process inputs describing two-dimensional movements for vehicles that can move in two dimensions (e.g., automobiles). One skilled in the art will appreciate that other context-dependent configurations of universal features of the vehicle control and interface system 100 are possible.

The universal vehicle control interfaces 110 is a set of universal interfaces configured to receive a set of universal vehicle control inputs to the vehicle control and interface system 100. The universal vehicle control interfaces 110 may include one or more digital user interfaces presented to an operator of a vehicle via one or more electronic displays. The universal vehicle control interfaces 110 may include a mechanical controller (e.g., mechanical sidestick) enabling four-axis control of a vehicle and provide independent force feel mechanisms in movement axes and redundancy measures for increased safety. An example of such a mechanical controller is described with reference to FIGS. 3-15. Additionally, the universal vehicle control interfaces 110 may include one or more controllers such as side sticks, center sticks, throttles, cyclic controllers, or collective controllers. The universal vehicle control interfaces 110 receive universal vehicle control inputs requesting operation of a vehicle. In particular, the inputs received by the universal vehicle control interfaces 110 may describe a requested trajectory of the vehicle, such as to change a velocity of the vehicle in one or more dimensions or to change an orientation of the vehicle. Because the universal vehicle control inputs describe an intended trajectory of a vehicle directly rather than describing vehicle-specific precursor values for achieving the intended trajectory, such as vehicle attitude inputs (e.g., power, lift, pitch, roll yaw), the universal vehicle control inputs can be used to universally describe a trajectory of any vehicle. This is in contrast to existing systems where control inputs are received as vehicle-specific trajectory precursor values that are specific to the particular vehicle. Advantageously, any individual interface of the set of universal vehicle control interfaces 110 configured to received universal vehicle control inputs can be used to completely control a trajectory of a vehicle. This is in contrast to conventional systems, where vehicle trajectory must be controlled using two or more interfaces or inceptors that correspond to different axes of movement or vehicle actuators. For instance, conventional rotorcraft systems include different cyclic (controlling pitch and roll), collective (controlling heave), and pedal (controlling yaw) inceptors. Similarly, conventional fixed-wing aircraft systems include different stick or yoke (controlling pitch and role), power (controlling forward movement), and pedal (controlling yaw) inceptors.

In various embodiments, inputs received by the universal vehicle control interfaces 110 can include "steady-hold" inputs, which may be configured to hold a parameter value fixed (e.g., remain in a departed position) without a continuous operator input. Such variants can enable hands-free operation, where discontinuous or discrete inputs can result in a fixed or continuous input. In a specific example, a user of the universal vehicle control interfaces 110 can provide an input (e.g., a speed input) and subsequently remove their hands with the input remaining fixed. Alternatively, or additionally, inputs received by the universal vehicle control interfaces 110 can include one or more self-centering or automatic return inputs, which return to a default state without a continuous user input.

In some embodiments, the universal vehicle control interfaces 110 include interfaces that provide feedback information to an operator of the vehicle. For instance, the universal vehicle control interfaces 110 may provide information describing a state of a vehicle integrated with the universal vehicle control interfaces 110 (e.g., current vehicle speed, direction, orientation, location, etc.). Additionally, or alternatively, the universal vehicle control interfaces 110 may provide information to facilitate navigation or other operations of a vehicle, such as visualizations of maps, terrain, or other environmental features around the vehicle.

The universal vehicle control router 120 routes universal vehicle control inputs describing operation of a vehicle to components of the vehicle suitable for executing the operation. In particular, the universal vehicle control router 120 receives universal vehicle control inputs describing the operation of the vehicle, processes the inputs using information describing characteristics of the aircraft, and outputs a corresponding set of commands for actuators of the vehicle (e.g., the vehicle actuators 130) suitable to achieve the operation. The universal vehicle control router 120 may use various information describing characteristics of a vehicle in order to convert universal vehicle control inputs to a suitable set of commands for actuators of the vehicle. Additionally, or alternatively, the universal vehicle control router 120 may convert universal vehicle control inputs to a set of actuator commands using a set of control laws that enforce constraints (e.g., limits) on operations requested by the universal control inputs. For example, the set of control laws may include velocity limits (e.g., to prevent stalling in fixed-wing aircraft), acceleration limits, turning rate limits, engine power limits, rotor revolution per minute (RPM) limits, load power limits, allowable descent altitude limits, etc. After determining a set of actuator commands, the universal vehicle control router 120 may transmit the commands to relevant components of the vehicle for causing corresponding actuators to execute the commands.

The universal vehicle control router 120 can decouple axes of movement for a vehicle in order to process received universal vehicle control inputs. In particular, the universal vehicle control router 120 can process a received universal vehicle control input for one axis of movement without impacting other axes of movement such that the other axes of movement remain constant. In this way, the universal vehicle control router 120 can facilitate "steady-hold" vehicle control inputs, as described above with reference to the universal vehicle control interfaces 110. This is in contrast to conventional systems, where a vehicle operator must manually coordinate all axes of movement independently for a vehicle in order to produce movement in one axis (e.g., a pure turn, a pure altitude climb, a pure forward acceleration, etc.) without affecting the other axes of movement.

In some embodiments, the universal vehicle control router 120 is configured to use one or more models corresponding to a particular vehicle to convert universal vehicle control inputs to a suitable set of commands for actuators of the vehicle. For example, a model may include a set of parameters (e.g., numerical values) that can be used as input to universal input conversion processes in order to generate actuator commands suitable for a particular vehicle. In this way, the universal vehicle control router 120 can be integrated with vehicles by substituting models used by processes of the universal vehicle control router 120, enabling efficient integration of the vehicle control and interface system 100 with different vehicles. The one or more models may be obtained by the universal vehicle control router 120 from a vehicle model database or other first-party or third-party system, e.g., via a network. In some cases, the one or more models may be static after integration with the vehicle control and interface system 100, such as if a vehicle integrated with the vehicle control and interface system 100 receives is certified for operation by a certifying authority (e.g., the United States Federal Aviation Administration). In some embodiments, parameters of the one or more models are determined by measuring data during real or simulated operation of a corresponding vehicle and fitting the measured data to the one or more models.

In some embodiments, the universal vehicle control router 120 processes universal vehicle control inputs according to a current phase of operation of the vehicle. For instance, if the vehicle is a rotorcraft, the universal vehicle control router 120 may convert a universal input describing an increase in lateral speed to one or more actuator commands differently if the rotorcraft is in a hover phase or in a forward flight phase. In particular, in processing the lateral speed increase universal input the universal vehicle control router 120 may generate actuator commands causing the rotorcraft to strafe if the rotorcraft is hovering and causing the rotorcraft to turn if the rotorcraft is in forward flight. As another example, in processing a turn speed increase universal input the universal vehicle control router 120 may generate actuator commands causing the rotorcraft to perform a pedal turn if the rotorcraft is hovering and ignore the turn speed increase universal input if the rotorcraft is in another phase of operation. As a similar example for a fixed-wing aircraft, in processing a turn speed increase universal input the universal vehicle control router 120 may generate actuator commands causing the fixed-wing aircraft to perform tight ground turn if the fixed-wing aircraft is grounded and ignore the turn speed increase universal input if the fixed-wing aircraft is in another phase of operation. One skilled in the art will appreciate that the universal vehicle control router 120 may perform other suitable processing of universal vehicle control inputs to generate actuator commands in consideration of vehicle operation phases for various vehicles.

The vehicle actuators 130 are one or more actuators configured to control components of a vehicle integrated with the universal vehicle control interfaces 110. For instance, the vehicle actuators may include actuators for controlling a power-plant of the vehicle (e.g., an engine). Furthermore, the vehicle actuators 130 may vary depending on the particular vehicle. For example, if the vehicle is a rotorcraft the vehicle actuators 130 may include actuators for controlling lateral cyclic, longitudinal cyclic, collective, and pedal controllers of the rotorcraft. As another example, if the vehicle is a fixed-wing aircraft the vehicle actuators 130 may include actuators for controlling a rudder, elevator, ailerons, and power-plant of the fixed-wing aircraft.

The vehicle sensors 140 are sensors configured to capture corresponding sensor data. In various embodiments the vehicle sensors 140 may include, for example, one or more global positioning system (GPS) receivers, inertial measurement units (IMUs), accelerometers, gyroscopes, magnetometers, pressure sensors (altimeters, static tubes, pitot tubes, etc.), temperature sensors, vane sensors, range sensors (e.g., laser altimeters, radar altimeters, lidars, radars, ultrasonic range sensors, etc.), terrain elevation data, geographic data, airport or landing zone data, rotor revolutions per minute (RPM) sensors, manifold pressure sensors, or other suitable sensors. In some cases the vehicle sensors 140 may include, for example, redundant sensor channels for some or all of the vehicle sensors 140. The vehicle control and interface system 100 may use data captured by the vehicle sensors 140 for various processes.

The data store 150 is a database storing various data for the vehicle control and interface system 100. For instance, the data store 150 may store sensor data (e.g., captured by the vehicle sensors 140), vehicle models, vehicle metadata, or any other suitable data.

Figure 2:
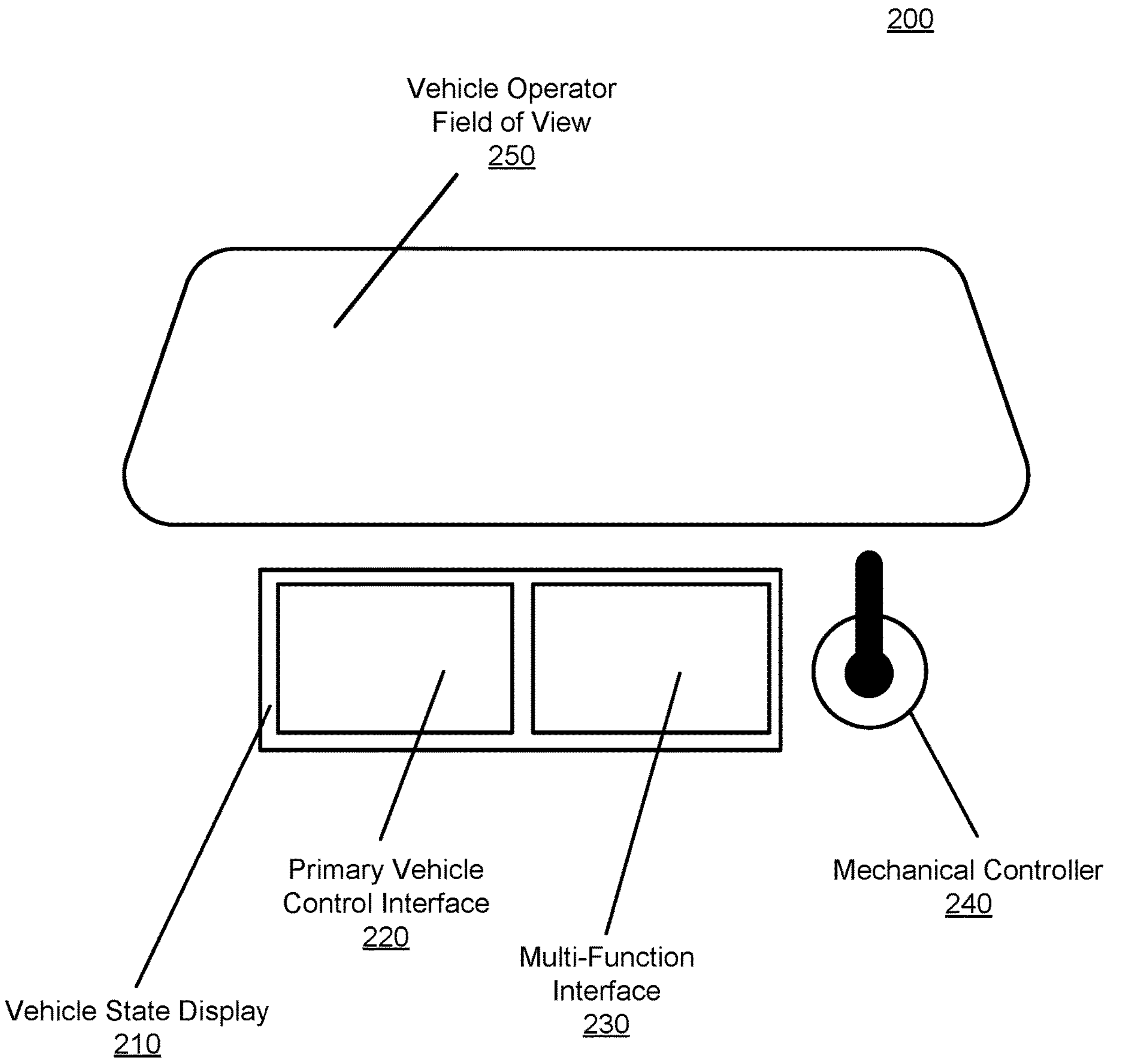
FIG. 2 depicts a configuration for a set of universal vehicle control interfaces in a vehicle, in accordance with one embodiment.

FIG. 2 illustrates one example embodiment of a configuration 200 for a set of universal vehicle control interfaces in a vehicle. The vehicle control interfaces in the configuration 200 may be embodiments of the universal vehicle control interfaces 110, as described above with reference to FIG. 1. In the embodiment shown, the configuration 200 includes a vehicle state display 210, a mechanical controller 240, and a vehicle operator field of view 250. In other embodiments, the configuration 200 may include different or additional elements. Furthermore, the functionality may be distributed among the elements in a different manner than described.

The vehicle state display 210 is one or more electronic displays (e.g., liquid-crystal displays (LCDs) configured to display or receive information describing a state of the vehicle including the configuration 200. In particular, the vehicle state display 210 may display various interfaces including feedback information for an operator of the vehicle. In this case, the vehicle state display 210 may provide feedback information to the operator in the form of virtual maps, 3D terrain visualizations (e.g., wireframe, rendering, environment skin, etc.), traffic, weather, engine status, communication data (e.g., air traffic control (ATC) communication), guidance information (e.g., guidance parameters, trajectory), and any other pertinent information. Additionally, or alternatively, the vehicle state display 210 may display various interfaces for configuring or executing automated vehicle control processes, such as automated aircraft landing or takeoff or navigation to a target location. The vehicle state display 210 may receive user inputs via various mechanisms, such as gesture inputs (as described above with reference to the gesture interface 220), audio inputs, or any other suitable input mechanism.

As depicted in FIG. 2 the vehicle state display 210 includes a primary vehicle control interface 220 and a multi-function interface 230. The primary vehicle control interface 220 is configured to facilitate short-term of the vehicle including the configuration 200. In particular, the primary vehicle control interface 220 includes information immediately relevant to control of the vehicle, such as current universal control input values or a current state of the vehicle. As an example, the primary vehicle control interface 220 may include a virtual object representing the vehicle in 3D or 2D space. In this case, the primary vehicle control interface 220 may adjust the display of the virtual object responsive to operations performed by the vehicle in order to provide an operator of the vehicle with visual feedback. The primary vehicle control interface 220 may additionally, or alternatively, receive universal vehicle control inputs via gesture inputs.

The multi-function interface 230 is configured to facilitate long-term control of the vehicle including the configuration 200. In particular, the primary vehicle control interface 220 may include information describing a mission for the vehicle (e.g., navigation to a target destination) or information describing the vehicle systems. Information describing the mission may include routing information, mapping information, or other suitable information. Information describing the vehicle systems may include engine health status, engine power utilization, fuel, lights, vehicle environment, or other suitable information. In some embodiments, the multi-function interface 230 or other interfaces enable mission planning for operation of a vehicle. For example, the multi-function interface 230 may enable configuring missions for navigating a vehicle from a start location to a target location. In some cases, the multi-function interface 230 or another interface provides access to a marketplace of applications and services. The multi-function interface 230 may also include a map, a radio tuner, or a variety of other controls and system functions for the vehicle.

In some embodiments, the vehicle state display 210 includes information describing a current state of the vehicle relative to one or more control limits of the vehicle (e.g., on the primary vehicle control interface 220 or the multi-function interface 230). For example, the information may describe power limits of the vehicle or include information indicating how much control authority a use has across each axis of movement for the vehicle (e.g., available speed, turning ability, climb or descent ability for an aircraft, etc.). In the same or different example embodiment, the vehicle state display 210 may display different information depending on a level of experience of a human operator of the vehicle. For instance, if the vehicle is an aircraft and the human operator is new to flying, the vehicle state display may include information indicating a difficulty rating for available flight paths (e.g., beginner, intermediate, or expert). The particular experience level determined for an operator may be based upon prior data collected and analyzed about the human operator corresponding to their prior experiences in flying with flight paths having similar expected parameters. Additionally, or alternatively, flight path difficulty ratings for available flight paths provided to the human operator may be determined based on various information, for example, expected traffic, terrain fluctuations, airspace traffic and traffic type, how many airspaces and air traffic controllers along the way, or various other factors or variables that are projected for a particular flight path. Moreover, the data collected from execution of this flight path can be fed back into the database and applied to a machine learning model to generate additional and/or refined ratings data for the operator for subsequent application to other flight paths. Vehicle operations may further be filtered according to which one is the fastest, the most fuel efficient, or the most scenic, etc.

The one or more vehicle state displays 210 may include one or more electronic displays (e.g., liquid-crystal displays (LCDs), organic light emitting diodes (OLED), plasma). For example, the vehicle state display 210 may include a first electronic display for the primary vehicle control interface 220 and a second electronic display for the multi-function interface 230. In cases where the vehicle state display 210 include multiple electronic displays, the vehicle state display 210 may be configured to adjust interfaces displayed using the multiple electronic displays, e.g., in response to failure of one of the electronic displays. For example, if an electronic display rendering the primary vehicle control interface 220 fails, the vehicle state display 210 may display some or all of the primary vehicle control interface 220 on another electronic display.

The one or more electronic displays of the vehicle state display 210 may be touch sensitive displays is configured to receive touch inputs from an operator of the vehicle including the configuration 200, such as a multi-touch display. For instance, the primary vehicle control interface 220 may be a gesture interface configured to receive universal vehicle control inputs for controlling the vehicle including the configuration 200 via touch gesture inputs. In some cases, the one or more electronic displays may receive inputs via other type of gestures, such as gestures received via an optical mouse, roller wheel, three-dimensional (3D) mouse, motion tracking device (e.g., optical tracking), or any other suitable device for receiving gesture inputs.

Touch gesture inputs received by one or more electronic displays of the vehicle state display 210 may include single finger gestures (e.g., executing a predetermined pattern, swipe, slide, etc.), multi-finger gestures (e.g., 2, 3, 4, 5 fingers, but also palm, multi-hand, including/excluding thumb, etc.; same or different motion as single finger gestures), pattern gestures (e.g., circle, twist, convergence, divergence, multi-finger bifurcating swipe, etc.), or any other suitable gesture inputs. Gesture inputs can be limited asynchronous inputs (e.g., single input at a time) or can allow for multiple concurrent or synchronous inputs. In variants, gesture input axes can be fully decoupled or independent. In a specific example, requesting a speed change holds other universal vehicle control input parameters fixed—where vehicle control can be automatically adjusted in order to implement the speed change while holding heading and vertical rate fixed. Alternatively, gesture axes can include one or more mutual dependencies with other control axes. Unlike conventional vehicle control systems, such as aircraft control systems, the gesture input configuration as disclosed provides for more intuitive user experiences with respect to an interface to control vehicle movement.

In some embodiments, the vehicle state display 220 or other interfaces are configured to adjust in response to vehicle operation events, such as emergency conditions. For instance, in response to determining the vehicle is in an emergency condition, the vehicle control and interface system 100 may adjust the vehicle state display 210 to include essential information or remove irrelevant information. As an example, if the vehicle is an aircraft and the vehicle control and interface system 100 detects an engine failure for the aircraft, the vehicle control and interface system 100 may display essential information on the vehicle state display 210 including 1) a direction of the wind, 2) an available glide range for the aircraft (e.g., a distance that the aircraft can glide given current conditions), or 3) available emergency landing spots within the glide range. The vehicle control and interface system 100 may identify emergency landing locations using various processes, such as by accessing a database of landing spots (e.g., included in the data store 150 or a remote database) or ranking landing spots according to their suitability for an emergency landing.

Figure 3:
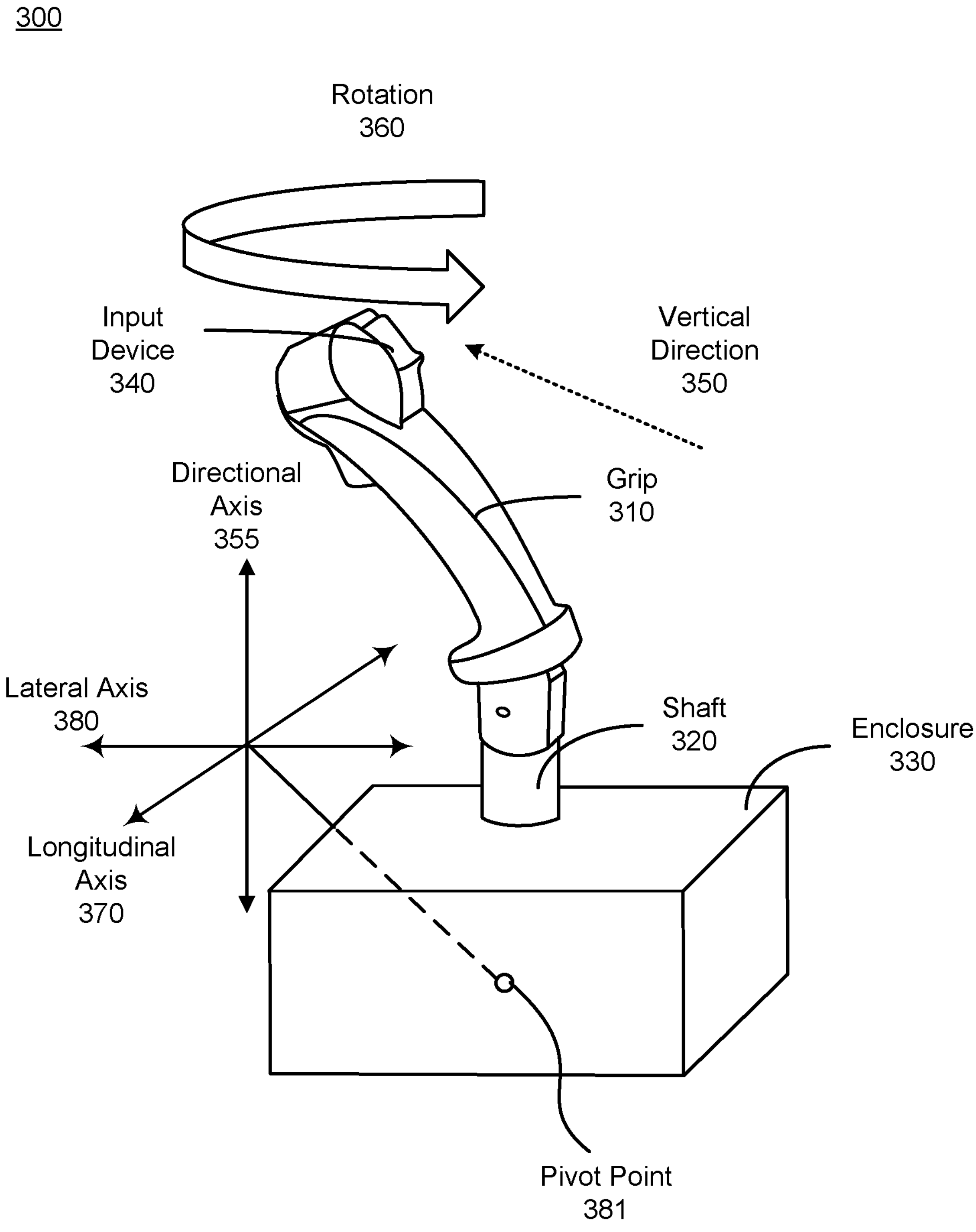
FIG. 3 shows a mechanical controller, in accordance with one embodiment.

The mechanical controller 240 may be configured to receive universal vehicle control inputs. In particular, the mechanical controller 240 may be configured to receive the same or similar universal vehicle control inputs as a gesture interface of the vehicle state display 210 is configured to receive. In this case, the gesture interface and the mechanical controller 240 may provide redundant or semi-redundant interfaces to a human operator for providing universal vehicle control inputs. The mechanical controller 240 may be active or passive. Additionally, the mechanical controller 240 and may include force feedback mechanisms along any suitable axis. For instance, the mechanical controller 240 may be a 4-axis controller (e.g., with a thumbwheel) as depicted in FIG. 3.

The components of the configuration 200 may be integrated with the vehicle including the configuration 200 using various mechanical or electrical components. These components may enable adjustment of one or more interfaces of the configuration 200 for operation by a human operator of the vehicle. For example, these components may enable rotation or translation of the vehicle state display 230 toward or away from a position of the human operator (e.g., a seat where the human operator sits). Such adjustment may be intended, for example, to prevent the interfaces of the configuration 200 from obscuring a line of sight of the human operator to the vehicle operator field of view 250.

The vehicle operator field of view 250 is a first-person field of view of the human operator of the vehicle including the configuration 200. For example, the vehicle operator field of view 250 may be a windshield of the vehicle or other suitable device for enabling a first-person view for a human operator.

The configuration 200 additionally or alternately include other auxiliary feedback mechanisms, which can be auditory (e.g., alarms, buzzers, etc.), haptic (e.g., shakers, haptic alert mechanisms, etc.), visual (e.g., lights, display cues, etc.), or any other suitable feedback components. Furthermore, displays of the configuration 200 (e.g., the vehicle state display 210) can simultaneously or asynchronously function as one or more of different types of interfaces, such as an interface for receiving vehicle control inputs, an interface for displaying navigation information, an interface for providing alerts or notifications to an operator of the vehicle, or any other suitable vehicle instrumentation. Furthermore, portions of the information can be shared between multiple displays or configurable between multiple displays.

A benefit of the configuration 200 is to minimize the intricacies of vehicle operation that an operator would handle in a conventional vehicle control system. The mechanical controller described herein contributes to this benefit by providing vehicle movement controls through fewer user inputs than a conventional vehicle control system. For example, an aircraft may have a hand-operated control stick for controlling the elevator and aileron, foot-operated pedals for controlling the rudder, buttons for controlling throttle, propeller, and other controls throughout the cockpit of the aircraft. In one embodiment, the mechanical controller described herein may be operated using a single hand of the operator to control the speed and direction of the aircraft. For example, the operator may move the mechanical controller about the lateral, longitudinal, and directional axes corresponding to instructions for operating the elevator, aileron, and rudder of the aircraft to control direction. Further, the operator may use the thumb of their hand already holding the mechanical controller to control a fourth-axis input of the mechanical controller and control speed of the aircraft. For example, the operator spins a thumbwheel on the mechanical controller to increase or decrease the speed of the aircraft. In at least this way, the configuration 200 and the mechanical controller described herein can reduce the cognitive load demanded of a vehicle operator.

Example Mechanical Controller

FIG. 3 shows a mechanical controller 300, in accordance with one embodiment. The mechanical controller 300 includes a grip 310, a shaft 320, and an enclosure 330. In some embodiments, the mechanical controller 300 may include additional or alternative components with shared functionality to those shown in FIG. 3. The shaft 320 extends from the enclosure 330, and the grip 310 is coupled to the shaft 320 at an end that extends from the enclosure 330. The shaft is coupled to contents of the enclosure 330, which are described in relation to FIGS. 4-15. The mechanical controller 300 may be a sidestick (e.g., located at a side console of a pilot).

The mechanical controller 300 may provide inputs to a flight control system (e.g., the vehicle control and interface system 100). Inputs to the flight control system can include interactions with the input device 340. Additionally, the inputs may be derived from rotations of the mechanical controller 300 (e.g., movement instructions proportional to the rotations). The rotations can include longitudinal, lateral, and directional rotations. Longitudinal rotations are rotations about the longitudinal axis 370, which can also be referred to as the pitch axis. Longitudinal rotations can also be referred to as movement along the lateral axis 380. Lateral rotations are rotations about the lateral axis 380, which can also be referred to as the roll axis. Lateral rotations can also be referred to as movement along the longitudinal axis 370. Directional rotations are rotations about the directional axis 355, which can also be referred to as the yaw axis. The longitudinal axis 370 and the lateral axis 380 may form a plane that tilts as the mechanical controller 300 is moved. The directional axis 355 is perpendicular to this plane. The longitudinal axis 370, the lateral axis 380, and the directional axis 355 intersect at the pivot point 381.

In some embodiments, for a fixed wing aircraft, rotating the mechanical controller 300 about the directional axis may correspond to a control instruction to activate movement of the rudder to impart a yawing moment on the aircraft. The yawing moment may be used to counteract moment produced by aileron movement (e.g., rotating the mechanical controller 300 about the lateral axis 380). In one example of aileron movement, the downward aileron may produce more lift and drag and the upward aileron may produce less lift and less drag. Thus, the directional rotation of the mechanical controller 300 to control the rudder can be used during an aircraft turning maneuver to balance yawing moment caused by aileron deflection and thereby optimize the aircraft sideslip relative to the current forward direction of motion. This may be referred to as turn coordination. In another example, the directional or rudder input may be used to help orient an aircraft along a desired flight path relative to the ground (e.g., a runway prior to touchdown) in the presence of a lateral wind component. In this example, the operator may use the mechanical controller 300 to cause the aircraft to sideslip relative to the wind direction in order to land in the direction of the runway.

In some embodiments, for a rotary wing aircraft, rotating the mechanical controller 300 about the directional axis may correspond to a control instruction to rotate the aircraft proportionately. Furthermore, for the rotary wing aircraft, moving the mechanical controller 300 along the lateral axis may correspond to a change in the speed of the aircraft (e.g., moving in a positive direction along the lateral axis corresponds to an increase in speed and moving along a negative direction corresponds to a decrease in speed). Further yet, for the rotary wing aircraft, moving the mechanical controller 300 along the longitudinal axis may correspond to a lateral movement (e.g., at a low speed) or a bank (e.g., at a high speed).

The grip 310 provides a handle for which a vehicle operator can interact to provide input to the mechanical controller 300 and communicate movements for a vehicle to a control system (e.g., the vehicle control and interface system 100) coupled to the mechanical controller 300. The grip 310 may be shaped like a handle, knob, lever, or any other shape that an operator may grasp. Though the grip 310 shown in FIG. 3 is a handle, in other embodiments, the grip may be any other suitable shape. The grip 310 may be made of metal, plastic, cushioning material (e.g., cloth or foam), any other suitable material, or some combination thereof. The grip may include one or more input devices 340. The grip 310 may be an ergonomic handle. The point at which the center of the index finger (e.g., near the middle phalanx) of the operator naturally sits at the front of the grip 310 may be called the grip reference point (GRP) and may be the point at which the longitudinal and lateral operator forces act. The GRP can be located closer to the center of the hand force. The index finger may be used to control an input at the grip 310 (e.g., a push to talk trigger) with minimal force exertion. In some embodiments, the mechanical controller 300 may be configured such that the pivot point 381 is located to reduce the rotation of the operator's wrist as the mechanical controller is moved. The rotation of the operator's wrist is reduced more as the pivot point 381 is located closer to the GRP. In some embodiments, the grip 310 includes a presence sensor configured to measure a force applied by an operator's hand upon the grip 310. Alternatively, the presence may be a capacitive or light based sensor that may enable the mechanical controller 300 to determine the presence of an operator's hand without directly measuring the force applied to the grip 310. The measurements of the presence sensor may be used for safety mechanisms. For example, the presence sensor detects an absence of force upon the grip 310 while the vehicle is moving and transmits instructions to a universal vehicle control router to display, at a control interface, a warning for the operator to place their hand around the grip 310.

The input device 340 of the grip is configured to receive inputs from an operator of the mechanical controller 300, which are used to control movement of the vehicle. The input device 340 may correspond to a fourth axis of control, where the first through third axes are the lateral, longitudinal, and directional axes. The inputs may affect the movement of the vehicle. For instance, the input device may be a thumbwheel that the operator can move in the vertical direction 350 to increase a vertical speed of the vehicle. The inputs may affect the position of the vehicle. For example, the thumbwheel may be used to adjust the elevation of the vehicle (e.g., increase the speed of the main rotor to produce a vertical force and elevate a helicopter). The input device may further be a paddle wheel, switch, button, or any other actuation through which a user may provide an input to the control system. Though only one input device 340 is shown in FIG. 3, in other embodiments, the grip 310 may include any number of input devices 340 each of different types (e.g., a trigger mechanism and a thumb input). Further, though the input device 340 of FIG. 3 is positioned under where an operator's thumb would be placed on the grip 310, in other embodiments, input device 340 may be placed at other positions on the grip 310 such that each input device 340 may be actuated by one or more other fingers of the operator. The input device 340 may include a thumbwheel that incorporates a spring return.

The shaft 320 is a rod configured to be displaced or rotated based on movement of the grip 310 by an operator. In particular, the shaft 320 is configured to be displaced along the longitudinal axis 370 and lateral axis 380 or rotated around the directional axis 355. Displacement and a rotation 360 of the shaft 320 follows from displacement and a rotation 360 of the grip 310 by an operator. Though the shaft 320 is shown as a rod in FIG. 3, in other embodiments the shaft 320 may be another piece or component similarly configured or the shaft 320 and the grip 310 may be a combined component of the mechanical controller 300. The shaft 320 may be made of metal, plastic, or a combination or materials. The shaft 320 is coupled to contents (e.g., gimbal mechanism) of the enclosure 330, which is further described in FIGS. 4-5.

The enclosure 330 encloses a portion of the shaft 320, a gimbal mechanism, and one or more force feel mechanisms. The gimbal mechanism is described in further detail in relation to FIGS. 6-10 and a force feel mechanism is described in detail in relation to FIGS. 11-15. The enclosure 330 may be made of metal, plastic, or a combination of materials. A top surface of the enclosure 330 allows the shaft 320 and grip 310 to move, and in some embodiments, the top portion of the enclosure 330 may be fully or partially composed of a malleable material, such as rubber.

The mechanical controller 300 includes one or more force feel mechanisms that provide an artificial feel of a direct mechanical connection between controllers and vehicle control interfaces. The longitudinal, lateral, and directional movements resist the operator's input movements with a total force feel that includes a basic force feel. Force feel, having units of, for example, Newtons or pounds, may be approximately proportionate to the displacement, having units of degrees, of rotation about a given axis. The displacement corresponding to a basic force feel of zero Newtons or pounds can be referred to as the zero-force null. In some embodiments, displacement may be a combination of angular and linear displacements. For example, displacement of a center stick controller may be linear within a plane made by the longitudinal and lateral axes at the zero-force null. The position of the zero-force null does not have to be at zero displacement. The position of zero-force null may be offset from the geometric axes of the controller 300 or the vehicle. In some embodiments, the position of the zero-force null may change in response to an operator's inputs in order to set the mechanical controller 300 at an offset position. For example, the universal vehicle control interfaces 110 may provide an interface (e.g., graphical user interface) including input elements for setting the offset position and provide the operator's chosen offset to the universal vehicle control router 120 to account for the chosen offset when determining vehicle operations corresponding to inputs at the mechanical controller 300. In some embodiments, the zero-force null position may remain fixed while the operator adjusts a command offset relative to the stick position. For example, the vehicle control and interface system 100 applies a displacement offset of positive ten degrees about the longitudinal axis to perform one or more commands that are triggered from interactions with the mechanical controller 300.

The mechanical controller 300 is configured to, when at the displacement corresponding to the zero-force null and displacements within a predefined range of the zero-force null (e.g., within one degree of the zero-force null at a given axis), exhibit a relatively increased stiffness as compared to the force feel of other displacements. The force feel within this predefined range of the zero-force null may be proportionate to the displacement with a greater gradient (e.g., an increase of one degree of displacement corresponds to a force feel increase of twenty two Newtons or approximately five pounds) while the force feel outside of the predefined range may also be proportionate to the displacement but with a smaller gradient (e.g., an increase of one degree of displacement corresponds to a force feel increase of four Newtons or approximately 1 pound). This increase in stiffness around the zero-force null may be used to provide the operator with a cue that the mechanical controller 300 is being moved away from or passing through the zero-force null. The increased stiffness may also provide increased centering accuracy when friction resists movement of the mechanical controller 300. The range of displacements of the mechanical controller 300 corresponding to the predefined range around and including the zero-force null may be referred to as the zero-force breakout region or "breakout region." In some embodiments, the force-feel at displacements outside of the breakout region may be nonlinear.

The mechanical controller 300 may be configured to cause the operator to apply increased force at greater displacements (e.g., a greater force is needed to rotate the displacement from nine to ten degrees than from one to two degrees). In some embodiments, the mechanical controller 300 is designed to include greater friction as the operator moves the mechanical controller 300 away from the breakout region and less friction as the operator moves the mechanical controller 300 towards the breakout region. Damping may be added to the longitudinal, lateral, and directional axes of the controller's movement to reduce oscillation of the mechanical controller 300 (e.g., under a free dynamic response). Structures of the controller's components for customizing the damping and friction impacting controller movement are described with respect to the gimbal and force feel mechanisms, including in the descriptions of FIGS. 6-15.

Figure 4:
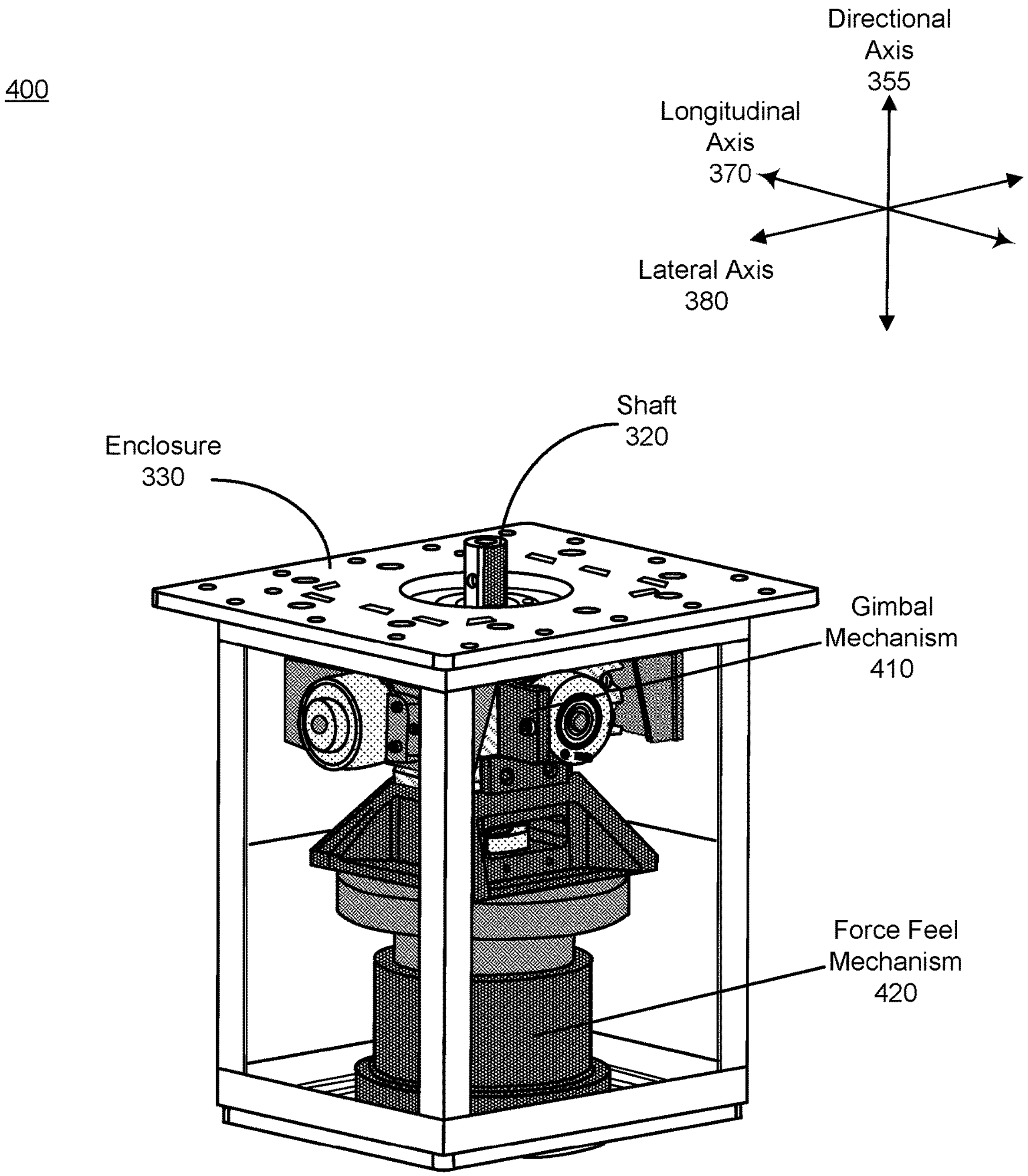
FIG. 4 illustrates an interior of an enclosure of the mechanical controller of FIG. 3, in accordance with one embodiment.

FIG. 4 illustrates an interior 400 of the enclosure 330 of the mechanical controller 300 of FIG. 3, in accordance with one embodiment. The enclosure 330 includes a gimbal mechanism 410, a force feel mechanism 420, and a portion of the shaft 320. The shaft 320 is coupled to the gimbal mechanism 410 and extends from a top of the enclosure 330. While not shown, the shaft 320 may extend through a portion of the enclosure 330 configured to isolate an inner portion of the shaft 320 from the external environment around the mechanical controller 300 while still allowing the shaft 320 to move and rotate. The portion of the enclosure 330 through which the shaft extends through may be rubber, cloth, another flexible material, or some combination thereof.

The gimbal mechanism 410 is configured to allow the shaft 320 to rotate about the directional axis 355 and be displaced along the longitudinal axis 370 and lateral axis 380, which each intersect at the center of the gimbal mechanism 410. The gimbal mechanism is coupled to the force feel mechanism 420 and may be additionally coupled to the inner portion 400 of the enclosure 330. The force feel mechanism 420 is configured to provide various resistances along the shaft 320 as the shaft 320 moves along or is rotated around the longitudinal axis 370 and lateral axis 380. In some embodiments, one or more additional force feel mechanisms are contained within a support housing (e.g., the support housing 520 shown in FIG. 5). The additional force feel mechanisms can provide various resistances along the shaft 320 as the shaft 320 rotates around the directional axis 355. The force feel mechanism 420 is further coupled to the inner portion 400 of the enclosure 330. These components, such as various force feel mechanisms, are described in more detail in relation to FIG. 5-15.

Figure 5:
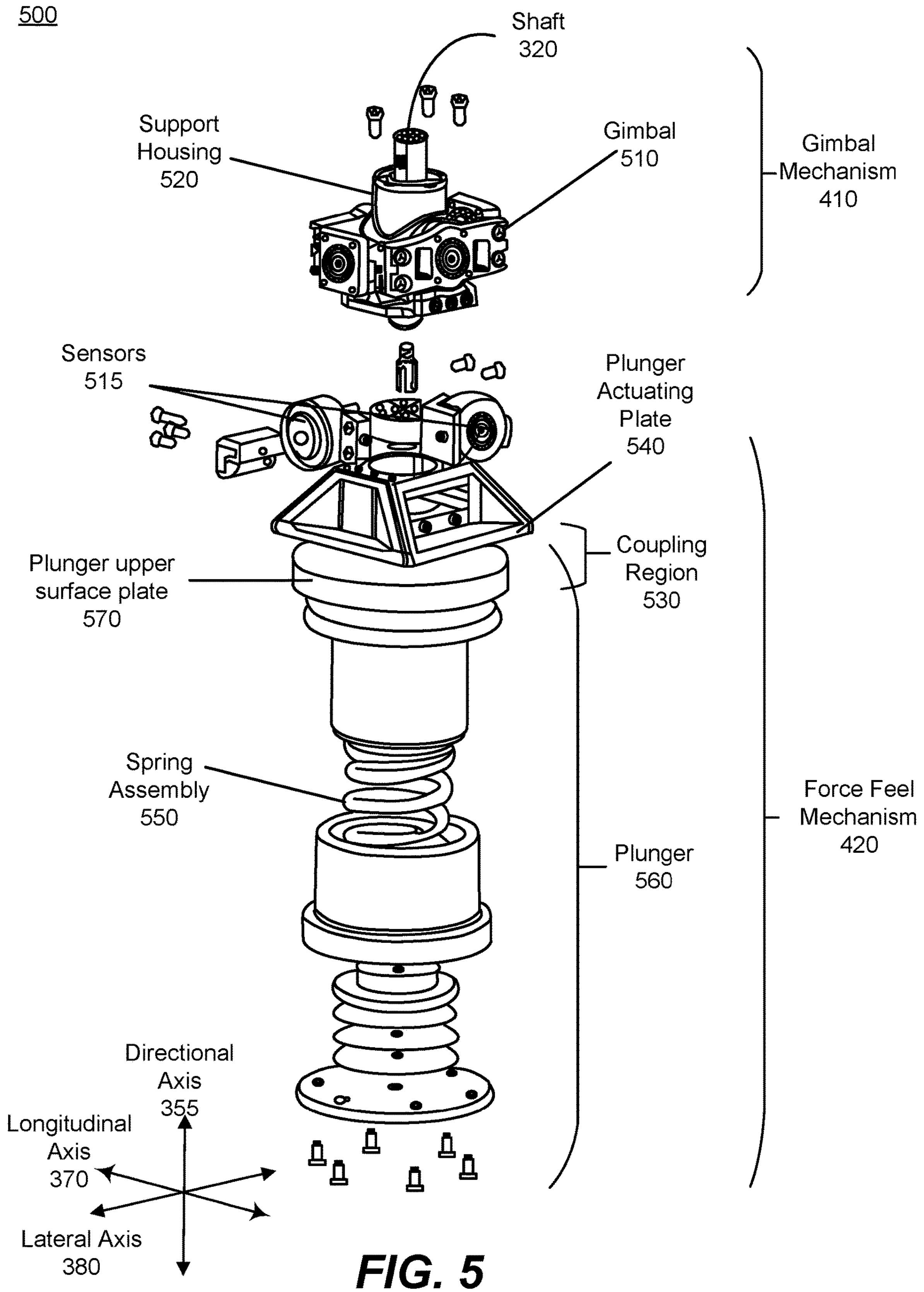
FIG. 5. depicts an exploded view of the interior of the enclosure of FIG. 4, in accordance with one embodiment.

FIG. 5. depicts an exploded view 500 of the interior 400 of the enclosure of FIG. 4, in accordance with one embodiment. In particular, FIG. 5 illustrates additional details of the gimbal mechanism 410 and the force feel mechanism 420. The gimbal mechanism 410 comprises a gimbal 510, a support housing 520, and one or more sensors 515, and the force feel mechanism 420 comprises a plunger 560, a plunger actuating plate 540, and a spring assembly 550. The plunger 560 is coupled to the spring assembly 550. The plunger 560 contacts the plunger actuating plate 540 at the plunger upper surface plate 570 of the plunger 560. The region of contact forms a contact region 330. In some embodiments, the gimbal mechanism 410 may include additional or alternative components to those shown in FIG. 5.

The gimbal 510 is a pivoted support and is configured to allow the shaft 320 to rotate about the directional axis 355. The gimbal 510 may be comprised of metal, plastic, or any other suitable material. The gimbal 510 is described further in relation to FIGS. 6-10. The gimbal 510 is depicted as further proximal to the operator's hand gripping the grip of the mechanical controller than the plunger 560 (e.g., the gimbal is above the plunger).

The support housing 520 is a structured support that is configured to hold the shaft 320 to the gimbal 510. The support housing 520 may be made of metal, plastic, or any other suitable material. The support housing 520 may be configured to move or rotate with the shaft 320 or may be configured to handle movement or rotation of the shaft 320 based on its material. For instance, in some embodiments, a top portion of the support housing 520 may be made of rubber such that the shaft 320 may impress into the top portion of the support housing 520 when the shaft 120 moves or rotates. The support housing 520 is described further in relation to FIGS. 6, 7, and 10.

The one or more sensors 515 are configured to communicate data to a vehicle control system (e.g., the vehicle control and interface system 100) about the movement and rotation of the gimbal 510 in response to the movement and rotation of the shaft 320. The one or more sensors 515 may be coupled to joints of the gimbal 510, as shown in FIG. 5. The one or more position sensors 515 may be magnetic sensors, accelerometers, or potentiometers or a combination of types of sensors. The position sensors 515 are described further in relation to FIGS. 8A and 8B (e.g., the lateral sensors 810, the longitudinal sensors 805, and the directional sensors 825).

The plunger actuating plate 540 is configured to move along the longitudinal axis 370 and lateral axis 380 based on movement of the shaft 320 received via the gimbal mechanism 410. The plunger actuating plate 540 may be made of metal, plastic, or a combination of materials. The plunger actuating plate 540 may include one or more webs designed to minimize bending of the plunger actuating plate 540 responsive to forces applied via the gimbal mechanism 410 or plunger 560. The plunger actuating plate 540 and the plunger upper surface plate 570 may be shaped to meet desired force feel characteristics, as is described in the descriptions of FIGS. 11A-15.

The plunger 560 is configured to operate with a plunging movement upon receiving force via the plunger actuating plate 540. The plunger may be made of metal or plastic or a combination of materials. Though only one plunger is shown in FIG. 5, in some embodiments, the force feel mechanism 420 may include multiple plungers configured to receive forces via the plunger actuating plate 540. In some embodiments, the plunger 560 has a diameter that is larger than the diameter or length of the gimbal 510. The plunger 560 may be shaped to include multiple pips that extend from the surface of the plunger towards the plunger actuating plate 540 or may include multiple pads that that curve downward along the surface of the plunger 560. These embodiments of the plunger 560 are further described with relation to FIGS. 11A-11B and 12A-12B, respectively.

As previously described, the plunger actuating plate 540 is coupled to (e.g., makes contact through a pressing movement) the plunger 560 at the plunger upper surface plate 570, forming a contact region 530. The contact region 530 between the plunger 560 and plunger actuating plate 540 may be shaped such that movement of the shaft 320 along the lateral axis 380 has a first resistance and movement of the shaft 320 along the longitudinal axis 370 has a second resistance that is different from the first resistance. In some embodiments, movement of the shaft 320 along the lateral axis 380 has a first set of resistances that are different from a second set of resistances of the movement of the shaft 320 along the longitudinal axis 370. The two sets of resistances may be different such that a resistance in the first set is not included in the second set and vice versa or different such that the two sets are not identical. In some embodiments, resistances in the lateral and longitudinal axes may be based on the shape of the upper surface plate 570. In one example of resistances enabled by the contact region 530, an operator may feel resistance from one side of the enclosure 330 upon moving the mechanical controller 300 along the lateral axis 380 to the left and may feel another resistance towards an adjacent side of the enclosure 330 upon moving the mechanical controller 300 forward along the longitudinal axis 370 due to the shaping of the plunger 560 and plunger actuating plate 540, which are further described in relation to FIGS. 11A-12B and FIG. 13A-15, respectively. In some embodiments, low friction treatments may be applied to the plunger 560 and plunger actuating plate 540 at the contact region to reduce friction. Examples of low friction treatments include incorporating materials such as Delrin®, polytetrafluoroethylene (PTFE) or Tungsten Disulfide (WS2) to the plunger upper surface plate 570 and/or plunger actuating plate 540. In one embodiment, a low friction treatment of PTFE-impregnated hard anodic coating on an aluminum alloy (e.g., AMS 2482).

The spring assembly 550 is an elastic device configured to provide an opposing force and restoring moments to the plunger 560. The spring assembly 550 may include an elastomeric spring. Though only one spring is shown in the spring assembly 550 of FIG. 5, in some embodiments, the spring assembly 550 may include multiple springs or other elastic devices that are similarly configured. Employing multiple springs in the spring assembly 550 provides redundancy to the mechanical controller 300 to improve safety of use of the mechanical controller 300 when used to control a vehicle. For example, in some embodiments, the spring assembly 550 may comprise two springs installed next to one another (e.g., each top of each spring is coupled to the plunger 560 such as a concentric configuration) in place of the spring shown in FIG. 5. Both springs may be installed along the directional axis 355, and one spring may have a larger coil diameter than the other spring. If one of the two springs fails, the other spring is still in place for use in the mechanical controller 300. If this occurs, an operator may feel a lower resistance when moving or rotating the shaft 320.

Figure 6:
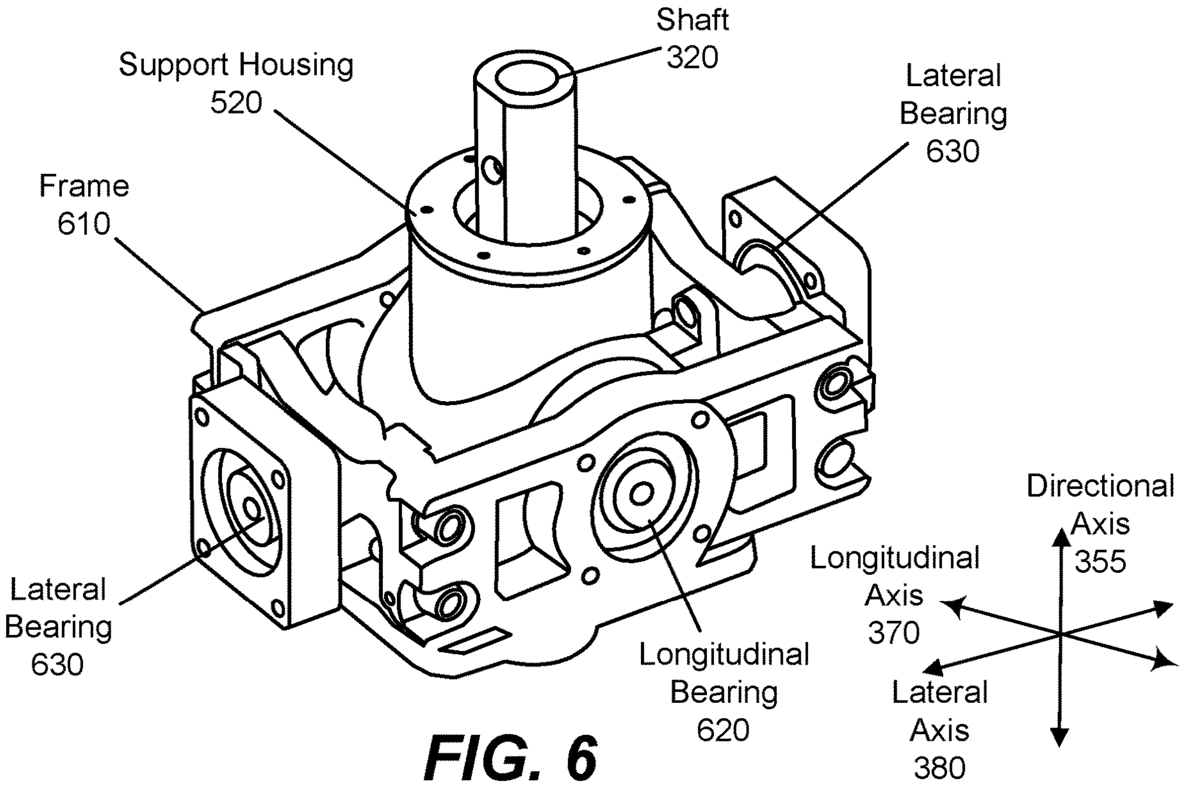
FIG. 6 shows a perspective view of a gimbal of the interior of the enclosure of FIG. 4, in accordance with one embodiment.

FIG. 6 shows a perspective view of a gimbal 510 of the interior of the enclosure 330 of FIG. 4, in accordance with one embodiment. The gimbal 510 includes the support housing 520, a frame 610, one or more lateral bearings 630, and one or more longitudinal bearings 620. Additional components of the gimbal 510 are depicted in other views of the gimbal 510 depicted in FIGS. 7-10.

The frame 610 supports the position of the shaft 320 and the support housing 520. The frame 610 may rotate about the lateral axis while the support housing 520 rotates about the longitudinal axis. The frame 610 can be coupled to the support housing 520. For example, the frame 610 may be coupled at the longitudinal bearings 630 such that the support housing 520 is moving about the longitudinal axis independent of the support housing 520. The longitudinal bearings 620 and the lateral bearings 630 may be coupled to the frame 610. In some embodiments, the bearings can be attached to the frame 610 or embedded within the frame 610. For example, the lateral bearings 630 may be attached to the frame 610 and the longitudinal bearings 620 may be embedded within the frame 610. The frame 610 may be rectangular in shape. The sides of the frame 610 along the length of the rectangular frame may be parallel to the lateral axis and the sides along the width of the rectangular frame can be parallel to the longitudinal axis. The longitudinal bearings 620 may be located along the sides along the length of the rectangular frame and allow the support housing 520 to move about the longitudinal axis. The lateral bearings 630 can be located along the sides along the width of the rectangular frame and allow the frame 610 along with the support housing 520 and the shaft 320 to rotate about the lateral axis. In other embodiments, the frame 610 has a different number of sides. For example, the frame may be octagonal in shape to have a similar shape with a circular enclosure. The frame 610 may be coupled to the inner surface of the enclosure 330 such that the position of the shaft 320 is maintained at a certain location within the enclosure 330. For example, portions of the frame 610 may move about the lateral axis due to the lateral bearings 630, but the movement of those portions are limited by certain contact points of the frame 610 that are fixed to the inner surface of the enclosure 330.

As described with respect to FIG. 5, the support housing 520 supports the position of the shaft 320 within the enclosure 330. The support housing 520 houses the shaft 320, which runs through the support housing 520 (e.g., through the center of the support housing 520). The support housing 520 can have openings for the shaft 320 to run through and space to support both the shaft and mechanisms for the shaft to rotate directionally (e.g., rolling elements) while experiencing resistance during rotation (e.g., springs to provide a force feel mechanism). In one embodiment, the support housing 520 includes directional bearings that keep the shaft 320 in place within the support housing (e.g., maintaining the shaft 320 concentric with the cylindrical space in the support housing 520 through which the shaft 320 runs through). Additionally, the directional bearings may serve as a rolling element enabling the shaft 520 to rotate about the directional axis.

The lateral bearings 630 and the longitudinal bearings 620 enable the shaft 320 to move about the lateral and longitudinal axes within the gimbal 510. The gimbal 510 may include one or more of each of the lateral bearings 630 and the longitudinal bearings 620. As depicted in FIG. 6, the gimbal 510 includes two lateral bearings 630 and two longitudinal bearings 620, where one of the longitudinal bearings is obstructed in the perspective view by the support housing 520. The lateral bearings 630 and the longitudinal bearings 620 may be any suitable bearings, such as rolling element bearings (e.g., ball bearings, cylindrical roller bearings, needle bearings), fluid bearings, magnetic bearings, or any suitable mechanism for allowing rotation between two components with reduced friction. The lateral bearings 630 enable movement of the frame 610, support housing 520, and the shaft 320 about the lateral axis (i.e., movement in the direction of the longitudinal axis). The longitudinal bearings 620 enable movement of the support housing 520 and the shaft 320 about the longitudinal axis (i.e., movement in the direction of the lateral axis). Although FIG. 6 depicts an embodiment of the gimbal 510 with a pair of longitudinal bearings and a pair of lateral bearings, different numbers of bearings may be implemented to support movement about the respective axes (e.g., one bearing per axis). In some embodiments, rolling element bearings are housed in bushes that allow rotation in the event of a bearing failure that causes the bearing to jam. The friction in the bush may be arranged so that the bearing rotates with low friction and in response to a bearing jamming, the higher friction at which the bearing rotates is detectable by the operator. One benefit of this configuration may be to provide redundancy.

Figure 7:
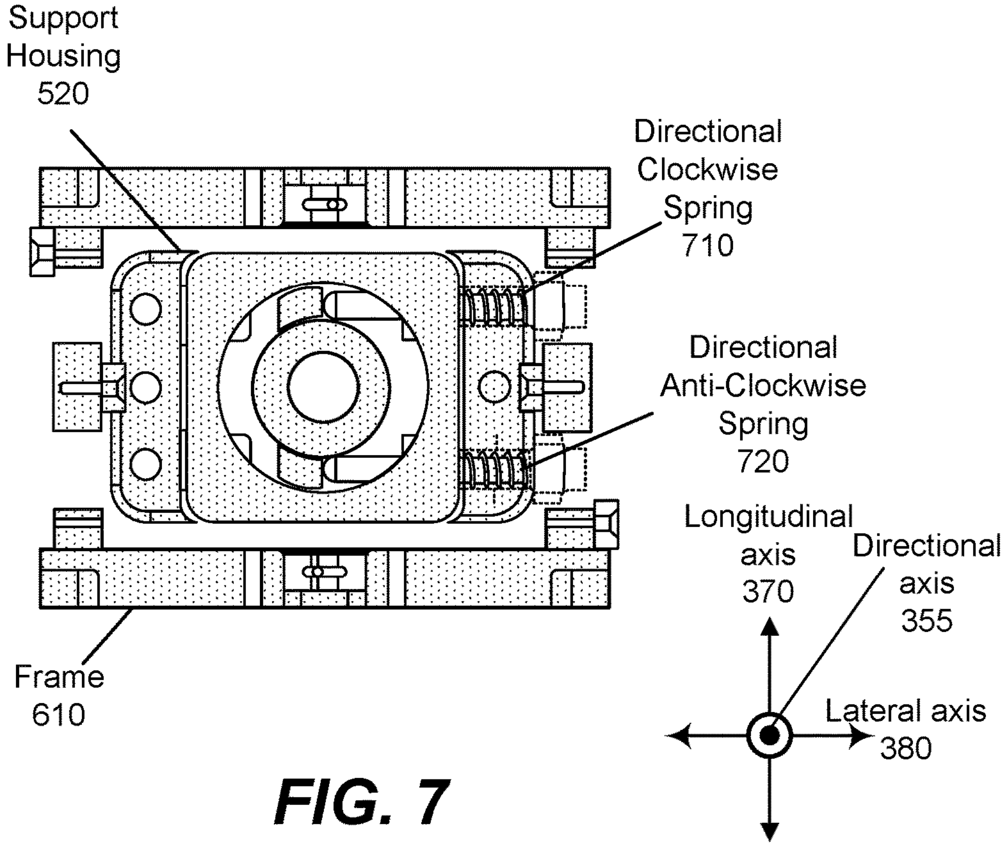
FIG. 7 shows a horizontal cross section through the central body of the gimbal of FIG. 6, in accordance with one embodiment.

FIG. 7 shows a bottom view of a horizontal cross section through the central body of the gimbal 510 of FIG. 6, in accordance with one embodiment. To promote clarity when viewing the directional force feel mechanism provided by the gimbal 510, the depiction of the horizontal cross section of the gimbal 510 in FIG. 7 does not include all elements of the gimbal 510. The directional force feel mechanism may be a second force feel mechanism of the mechanical controller 300, where the first force feel mechanism is provided via the force feel mechanism 420. This second force feel mechanism may enable the movement of the shift 320 about the directional axis to have a set of resistances that are different from the resistances provided by the first force feel mechanism.

The second force feel mechanism (the directional force feel mechanism) includes a directional clockwise spring 710 and a directional anticlockwise spring 720 of the gimbal 510. The directional clockwise spring 710 provides resistance, or a set of resistances, for clockwise rotation of the shaft about the directional axis. The directional clockwise spring 710 is coupled to the support housing 520 such that rotations of the shaft 320 compress the spring 710 against a surface that is fixed to the support housing 520. The directional anticlockwise spring 720 provides resistance, or a set of resistances, for anticlockwise rotation of the shaft 320 about the directional axis. The directional anticlockwise spring 720 is similarly coupled to the support housing 520 such that rotations of the shaft 320 compress the spring 720 against a surface that is fixed to the support housing 520.

Figure 8A:
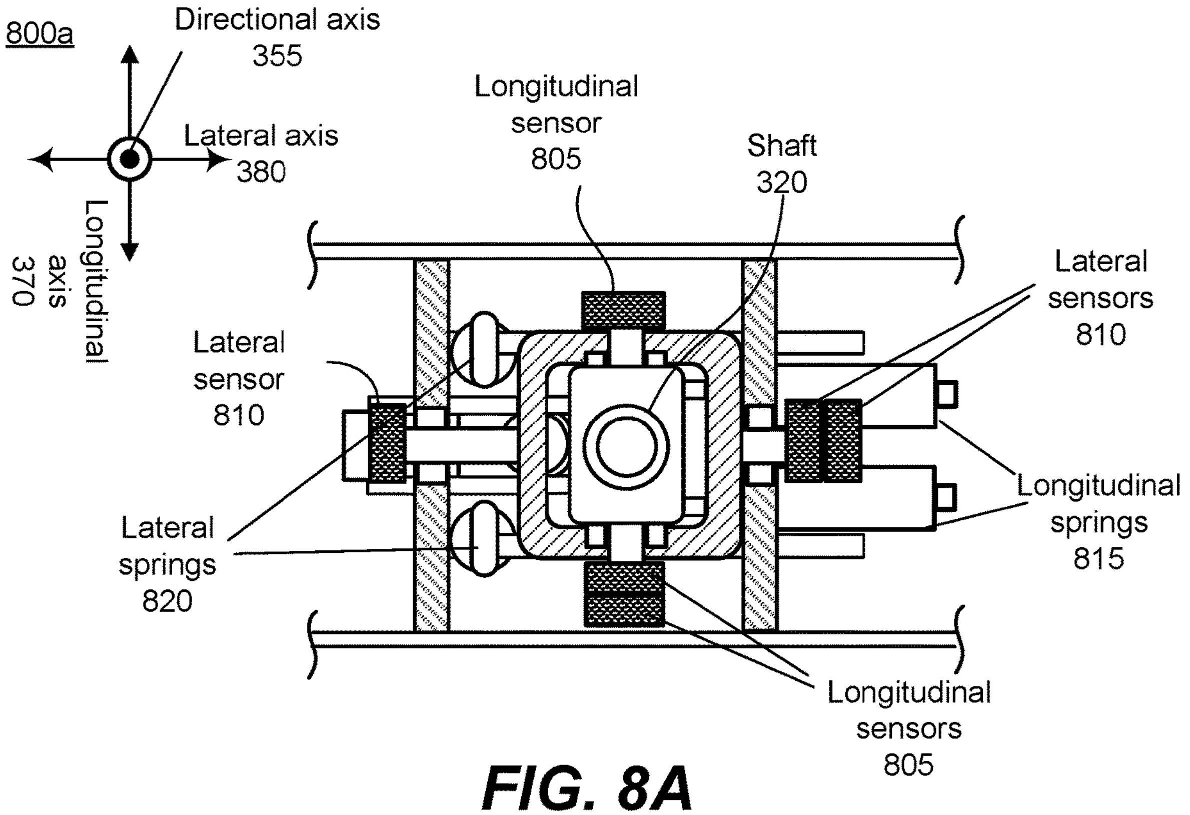
FIG. 8A depicts a top view of the gimbal of FIG. 6, in accordance with one embodiment.
Figure 8B:
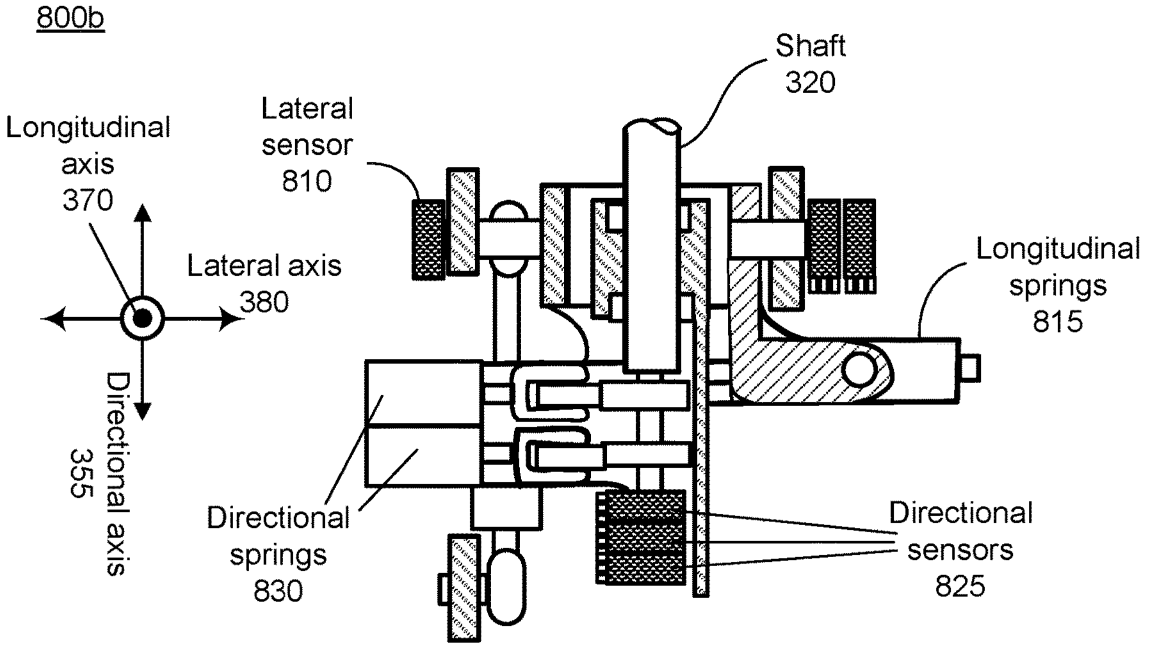
FIG. 8B depicts a side view of the gimbal of FIG. 6, in accordance with one embodiment.

Springs 710 and 720 are depicted in FIG. 7 as coiled springs. However, the spring mechanisms for providing force feel via the gimbal 510 may be a different type of spring (e.g., a Belleville spring, volute spring, leaf spring, gas spring, or any suitable mechanism for providing a force feel feedback). In some embodiments, the spring is a leaf spring assembly, which is described with respect to FIGS. 9A and 9B. That is, the second force feel mechanism may include one or more leaf spring assemblies (e.g., the leaf spring assembly is associated with the directional axis by providing resistance against rotation in the directional axis). Each leaf spring assembly may be configured to bend when the directional axis is deflected. The springs within the gimbal 510 may be enclosed within a housing, which are depicted as transparent in the view of FIG. 7 to provide unobstructed views of the coiled springs within the housings. The housing of the springs are shown in FIGS. 8A and 8B (e.g., the housing of the longitudinal and lateral springs). Although one pair of clockwise and anticlockwise springs is shown, additional springs or pairs of springs may be included in the gimbal 510 (e.g., for increased resistance or redundancy).

FIG. 8A depicts a top view 800*a* of the gimbal 510 of FIG. 6, in accordance with one embodiment. FIG. 8B depicts a side view 800*b* of the gimbal 510 of FIG. 6, in accordance with one embodiment. The top view 800*a* depicts longitudinal sensors 805, lateral sensors 810, longitudinal springs 815, and lateral springs 820. The side view 800*b* further depicts directional sensors 825. To promote clarity of these components in the top view 800*a* and the side view 800*b*, some components of the gimbal 510, such as the frame, bearings, and directional springs, are not depicted.

The longitudinal sensors 805, the lateral sensors 810, and the directional sensors 825 may be position sensors. Examples of suitable position sensors include angular position sensors, rotary encoders, potentiometers, or any suitable sensor that measures a value of the angular displacement of a component of the gimbal 510 about an axis (e.g., lateral, longitudinal, or directional) or measures a value proportionate to the angular displacement (e.g., the voltage output by a potentiometer). As depicted in FIGS. 8A and 8B, a given axis has three sensors (e.g., three lateral sensors 810 associated with the lateral axis 380). In some embodiments, all three sensors for an axis can be located at one end of a corresponding support shaft (e.g., a rod that runs parallel to the axis associated with the three sensors) in the gimbal 510. The sensors may be driven by two or more concentric shafts (e.g., the sensors measure rotations of one or more of the two or more concentric shafts).

The longitudinal sensors 805 are located on a line parallel or coinciding with the longitudinal axis 370. The longitudinal sensors 805 measure the position about the longitudinal axis 370. For example, the longitudinal sensors 805 determine the number of degrees from an initial or steady state position that the operator has rotated the shaft about the longitudinal axis 370. The longitudinal sensors 805 are coupled to the support housing 520. For example, the sensors 805 may be coupled using a rod that runs along the longitudinal axis and through the shaft 320 and the support housing 520, where the rod is coupled to longitudinal sensors at both ends. Although three longitudinal sensors 805 are depicted, fewer or more sensors may be implemented in the gimbal 510.

The lateral sensors 810 are located on a line parallel or coinciding with the longitudinal axis 370. The lateral sensors 810 measure the position about the lateral axis 380. For example, the lateral sensors 810 determine the number of degrees from an initial or steady state position that the operator has rotated the shaft about the lateral axis 380. The lateral sensors 810 are coupled to the support housing 520. For example, the sensors 810 may be coupled using a rod that runs along the lateral axis and through the shaft 320 and the support housing 520, where the rod is coupled to lateral sensors at both ends. Although three lateral sensors 810 are depicted, fewer or more sensors may be implemented in the gimbal 510.

The directional sensors 825 may be coupled to the shaft 320 or a component of the gimbal 510 that moves about the directional axis proportionate to the movement of the shaft 320 about the directional axis 355. The directional sensors 825 measure the position of the shaft 320 about the directional axis. For example, the directional sensors 825 determine the number of degrees from an initial or steady state position that the operator has rotated the shaft about the directional axis 355.

Figure 9A:
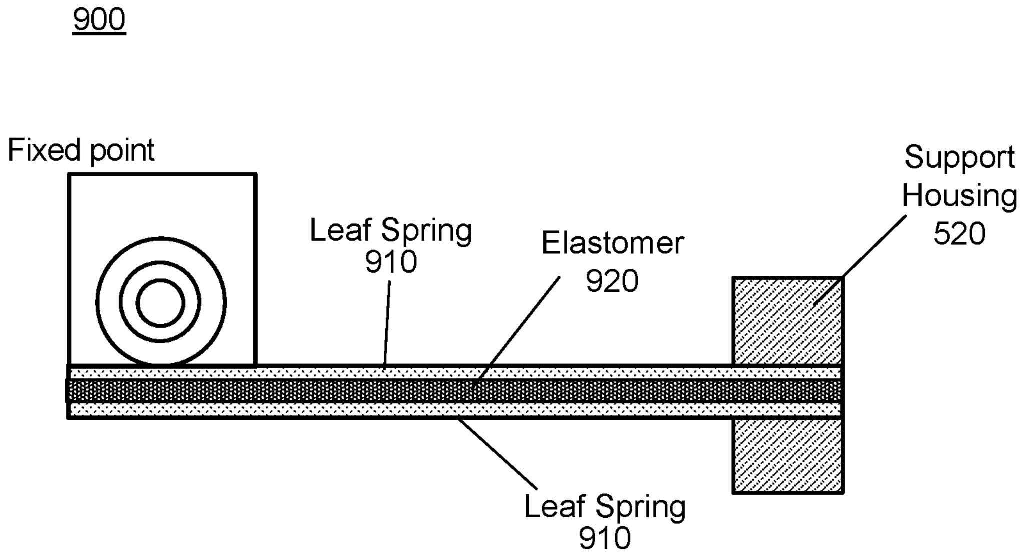
FIG. 9A illustrates a vertical cross section through an undeflected dual leaf spring assembly of a gimbal for a mechanical controller, in accordance with one embodiment.
Figure 9B:
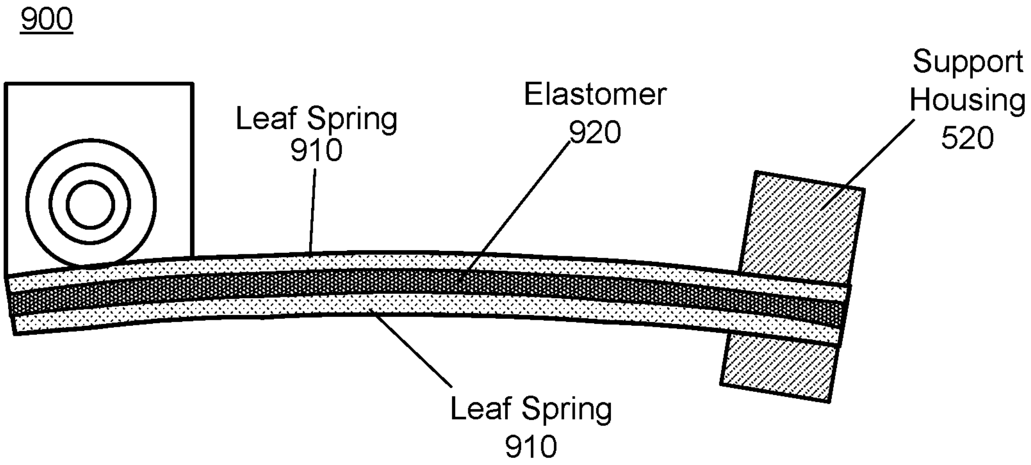
FIG. 9B illustrates a vertical cross section through a deflected dual leaf spring assembly of a gimbal for a mechanical controller, in accordance with one embodiment.

The longitudinal springs 815 and the lateral springs 820 provide resistance for rotations in the longitudinal axis 370 and the lateral axis 380, respectively. Two or more longitudinal springs 815 may be included within the gimbal 510, where at least one spring provides resistance for clockwise rotations about the longitudinal axis and at least one other spring provides resistance for anticlockwise rotations about the longitudinal axis. Similarly, two or more lateral springs 820 may be included within the gimbal 510, where at least one spring provides resistance for clockwise rotations about the lateral axis and at least one other spring provides resistance for anticlockwise rotations about the lateral axis. The longitudinal springs 815 are depicted showing the coiled springs as being compressible in a direction parallel or coinciding with the lateral axis. However, the springs 815 may be oriented in any suitable direction within a plane parallel to or coinciding with the plane formed by the directional and lateral axes. The lateral springs 820 are depicted showing the coiled springs as being compressible in a direction parallel or coinciding with the directional axis. However, the springs 820 may be located in any suitable direction within a plane parallel to or coinciding with the plane formed by the directional and longitudinal axes. Springs 815 and 820 may be coiled springs, Belleville springs, volute springs, leaf springs, gas springs, or any suitable mechanism for providing a force feel feedback. In some embodiments, the longitudinal springs 815, the lateral springs 820, or both are leaf spring assemblies as depicted in FIGS. 9A and 9B. Alternatively, non-mechanical mechanisms may be used to provide a force feel feedback to the operator. For example, a suitable resistive or elastic mechanism may be implemented. The longitudinal springs 815 are coupled to the frame 610 such that rotations of the shaft 320 within the support housing 520 compress the spring against a surface that is fixed to the frame 610 that is rotating about the support housing 520. Similarly, the lateral springs 820 are coupled to the frame 610 such that rotations of the shaft 320 within the support housing 520 compress the spring against a surface that is fixed to the frame 610 that is rotating about the support housing 520.

FIG. 9A illustrates a vertical cross section through an undeflected dual leaf spring assembly 900 of a gimbal for a mechanical controller, in accordance with one embodiment. FIG. 9B illustrates a vertical cross section through a deflected dual leaf spring assembly 900 of a gimbal for a mechanical controller (e.g., the mechanical controller 300), in accordance with one embodiment. The dual leaf spring assembly 900 includes at least two leaf springs 910 and an elastomer 920. The elastomer 920 may be located between the two leaf springs 910 (e.g., to provide damping). The leaf spring assembly 900 can be coupled to a rotating element of the gimbal, such as the support housing 520 or the shaft 320. As depicted in FIGS. 9A and 9B, the leaf spring assembly 900 is coupled to the support housing 520. The leaf spring assembly 900 is also coupled to a fixed point (e.g., a non-rotating point of the gimbal). The leaf spring assembly 900 may be coupled to the fixed point at one end of the spring assembly opposite from an end coupled to the rotating element. The fixed point may include a rolling element to reduce friction between the leaf spring assembly 900 and the fixed point. The leaf spring assembly 900 may serve as a resistance mechanism in addition to the coiled springs shown in FIGS. 6-8B. For example, redundant springs may be implemented within the gimbal mechanism 410 (e.g., for applications of the mechanical controller 300 where redundant force-feel mechanisms are used to meet certain safety requirements). Additionally or alternatively, the leaf spring assembly 900 may replace one or more of the coiled springs shown in FIGS. 6-8B.

Figure 10:
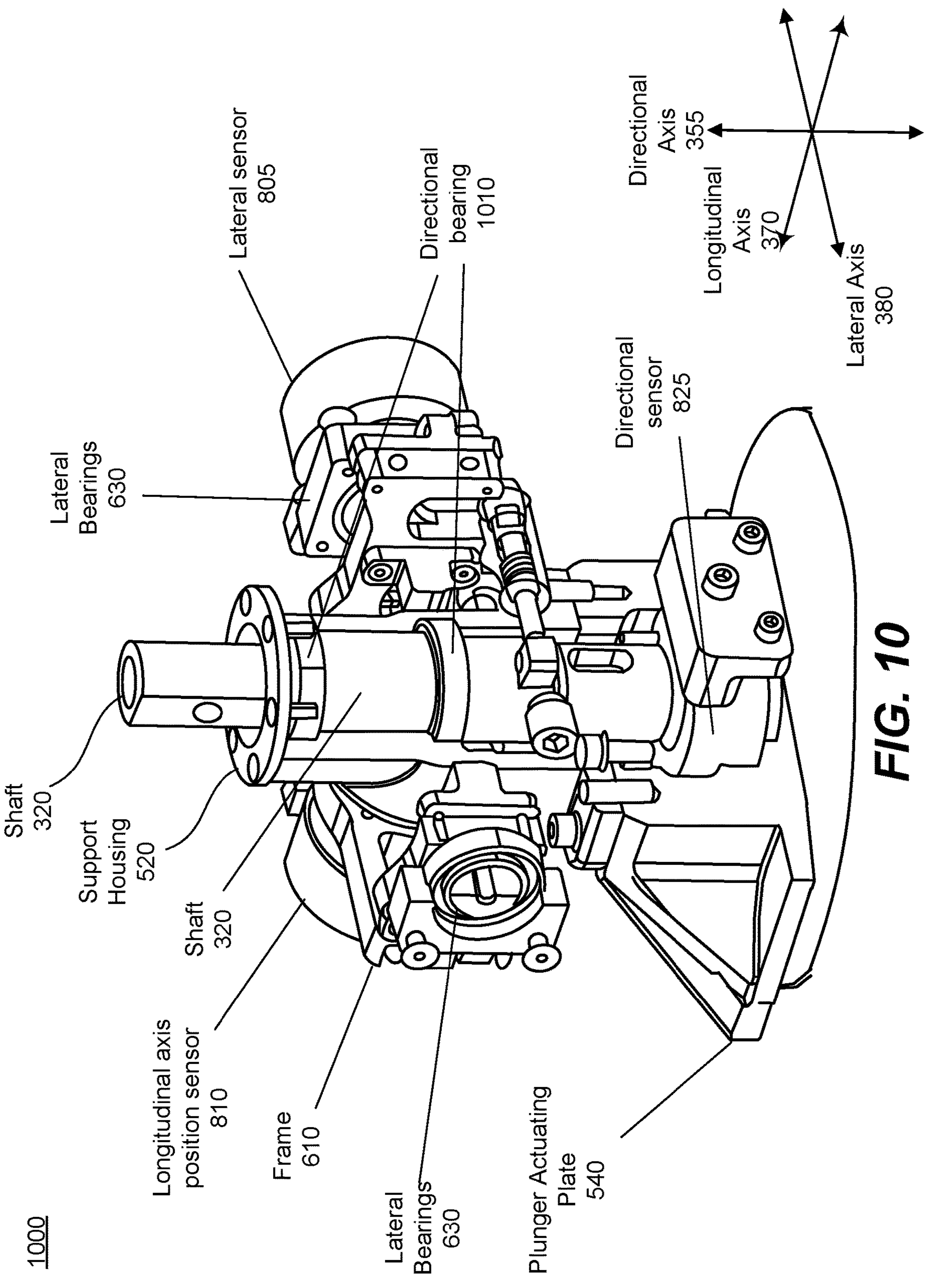
FIG. 10 depicts a support arrangement for directional axis movement of the mechanical controller of FIG. 3, in accordance with one embodiment.

FIG. 10 depicts a support arrangement 1000 for directional axis movement of the mechanical controller of FIG. 3, in accordance with one embodiment. The view of the support arrangement 1000 shown in FIG. 10 omits portions of the gimbal 510 to provide a clearer view of the interior of the gimbal mechanism 410. The view shows positions of the sensors 515 (e.g., the longitudinal sensor 810, lateral sensor 805, and directional sensor 825) relative to the frame 610. For example, the lateral sensor 805 is coupled a shaft running through one or more of the lateral bearings 630. The mechanical controller 300 is configured to enable the operator to move the shaft 320 about the longitudinal axis due to the longitudinal bearings, obstructed in the view shown in FIG. 10 by the support housing 520, coupled to the support housing 520. The support housing 520 can include directional bearings 1010 that keep the shaft 320 in place within the support housing (e.g., maintaining the shaft 320 concentric with the cylindrical space in the support housing 520 through which the shaft 320 runs through). The directional bearings 1010 are housed within the support housing 520. Additionally, the directional bearings 1010 may serve as a rolling element enabling the shaft 520 to rotate about the directional axis. Additionally, the operator is able to move the shaft 320 about the lateral axis due to the lateral bearings 630 coupled to the frame 610 that move the frame 610 along with the support housing 520 and the shaft 320. The directional movement is supported by space within the support housing 520 (e.g., the hollow space through the support housing 520 has a larger diameter than the diameter of the shaft 320) and one or more rolling elements between the shaft and the support housing 520 that enable the shaft to rotate with reduced friction within the support housing 520.

Figure 11A:
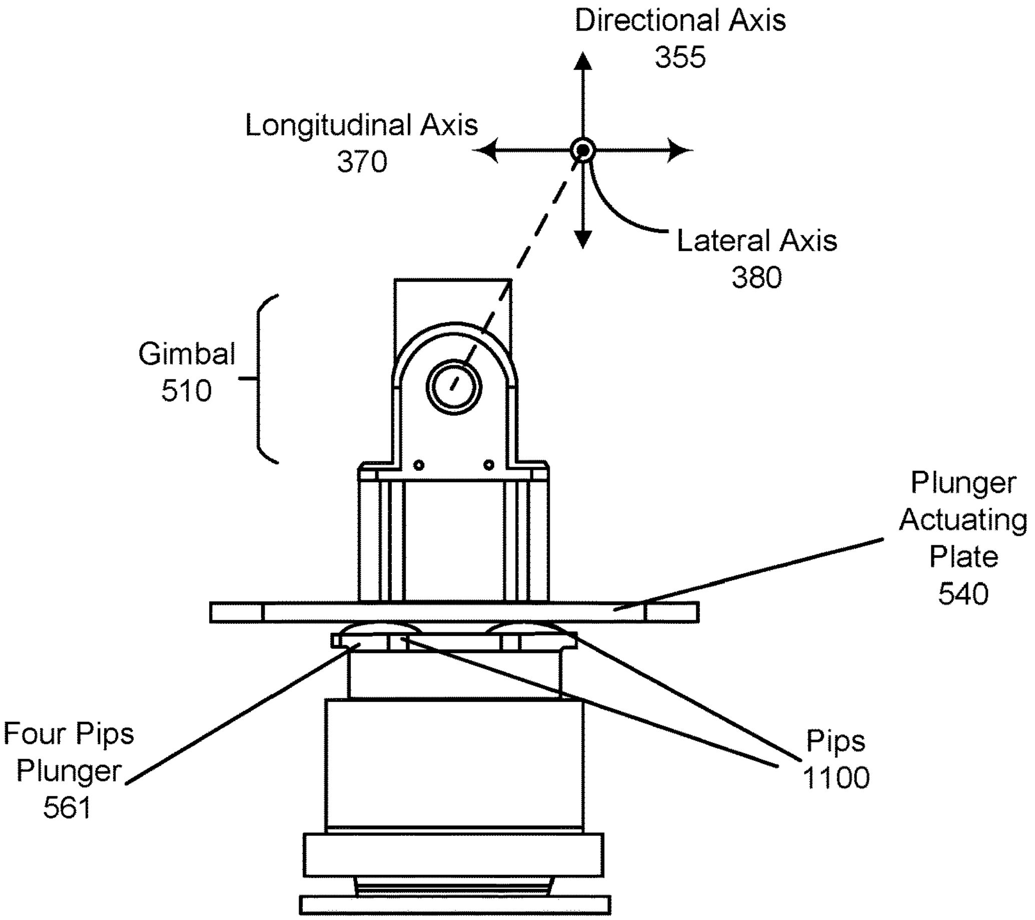
FIG. 11A shows a side view of a plunger configuration with pips, in accordance with one embodiment.
Figure 11B:
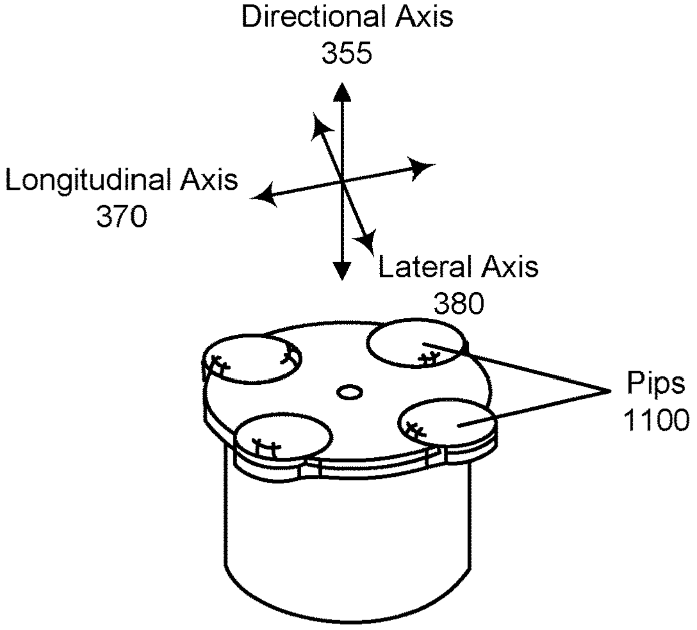
FIG. 11B shows a perspective view of a plunger configuration with pips, in accordance with one embodiment.

FIG. 11A shows a side view of a plunger configuration with pips, in accordance with one embodiment. FIG. 11B shows a perspective view of a plunger configuration with pips, in accordance with one embodiment. FIG. 11A shows a four pips plunger 561 (e.g., of the force feel mechanism 420 of FIG. 4). The four pips plunger 561 may be an embodiment of the plunger 560. In FIG. 11A, the four pips plunger 561 has four points of contact with the plunger actuating plate 540 due to the pips 1100 that extend from the surface of the four pips plunger 561, though only two points of contact are shown in the viewpoint of FIG. 11A. The plunger actuating plate 540 may be a flat plate as shown in FIG. 11A or may be shaped based on force feel characteristics, which describe the resistance felt by an operator upon moving the mechanical controller 300 via the grip 310. The resistance felt by the operator may be affected by friction, and an operator may feel the resistance of the mechanical controller 300 upon moving the grip 310 (and, consequently, the shaft 320) from a zero force null position. Incorporating damping and friction via the force feel characteristics may reduce oscillations within the mechanical controller 300.

The four pips 1100 are further shown in FIG. 11B, a top perspective view of the plunger 561. The pips 1100, which are raised areas on a plunger upper surface plate of the plunger 561, may be machined into the plunger upper surface plate. The pips 1100 may be evenly dispersed on the edges of the upper surface plate of the four pips plunger 561. In some embodiments, the pips 1100 may be further spaced apart in one axis than the other axis to create different detent forces in the longitudinal axis 370 and lateral axis 380. The four pips 1100 are arranged so that when a load is applied to a spring of the plunger 561 (e.g., via movement of the shaft 320), the plunger actuating plate 540 rests in a statically stable manner only when in contact with all four pips 1100. That is, in a steady state position or initial position (e.g., the operator is not handling the mechanical controller 300 and the stick has returned to the zero force null position at each rotational axis), the plunger actuating plate 540 may contact the four pips 1100. The spacing of the pips 1100 may be different along the longitudinal axis 370 and lateral axis 380 to generate different breakouts for each axis, and the surface profile of each pip 1100 may be selected to provide normal contact to the plunger actuating plate 540 at a radius of action (e.g., the radius at the actuation surface from a pivot point of the plunger actuating plate 540) determined to achieve a target feel characteristic.

As force is applied in one axis (e.g., the longitudinal axis 370, lateral axis 380, or directional axis 355), the plunger actuating plate 540 tilts and the load is supported on two of the pips 1100. The four pips plunger 561 may be keyed to a linear guide such that the four pips plunger 561 does not rotate relative to the support housing 520, so when the shaft 320 is displaced in either the longitudinal axis 370 or the lateral axis 380, only one pip 1100 can be in contact with the plunger actuating plate 540. The four pips plunger 561 can then compress (e.g., move downward) if the force applied through the two of the pips 1100 is greater than or equal to the load, resulting in a breakout. Once the shaft 320 is moved in one axis, if a force is subsequently applied in a second axis, then the plunger actuating plate 540 will rock onto one of the pips 1100 in the direction of movement. A higher force may be exerted to push the plunger actuating plate 540 onto the one of the pips 1100; thus, implementing a breakout in the second axis.

The positioning of the pips 1100 can cause the breakout in the second axis to increase as deflection from the force contacting two pips in the first axis increases. In particular, the breakout in the second axis increases as the amount of force needed to push the mechanical controller 300 from contacting two pips to contacting one pip increases. In this way, the pips 1100 further affect the breakout characteristics of the force feel mechanism associated with the plunger 561.

Figure 12A:
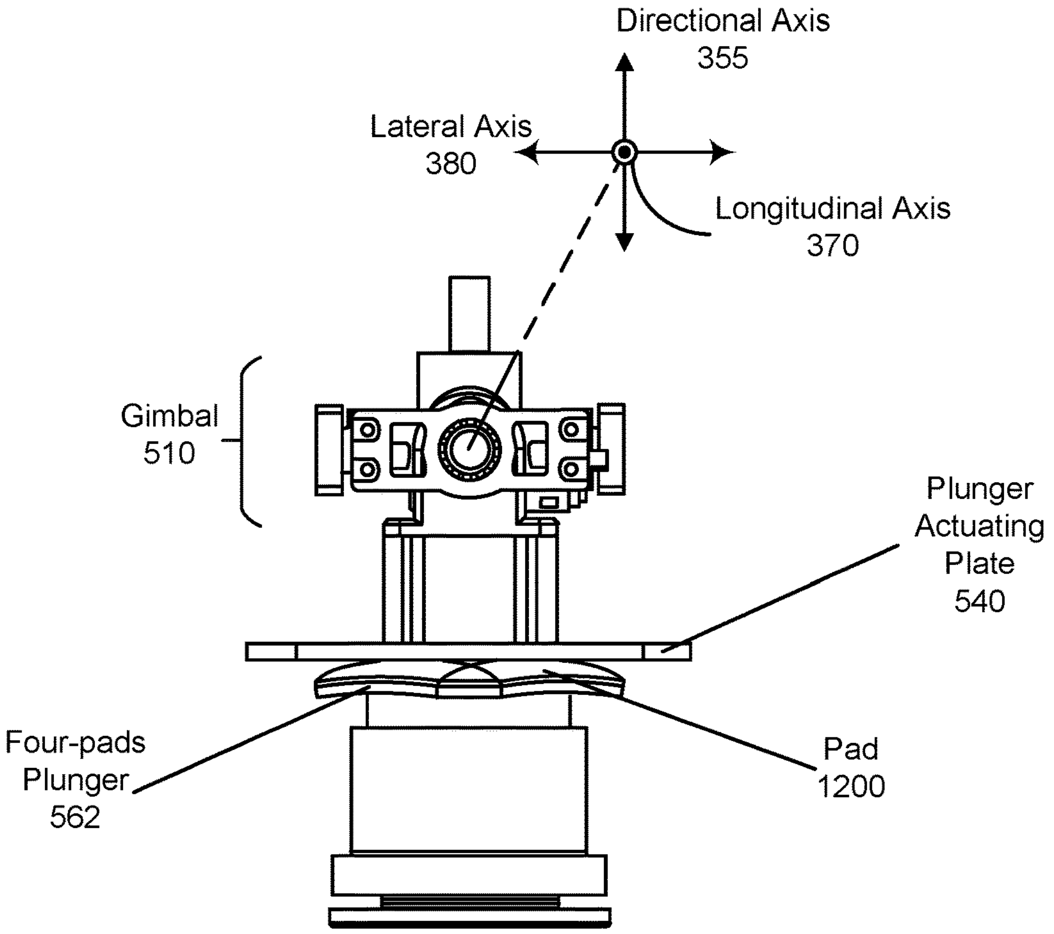
FIG. 12A shows a side view of a plunger configuration with pads, in accordance with one embodiment.
Figure 12B:
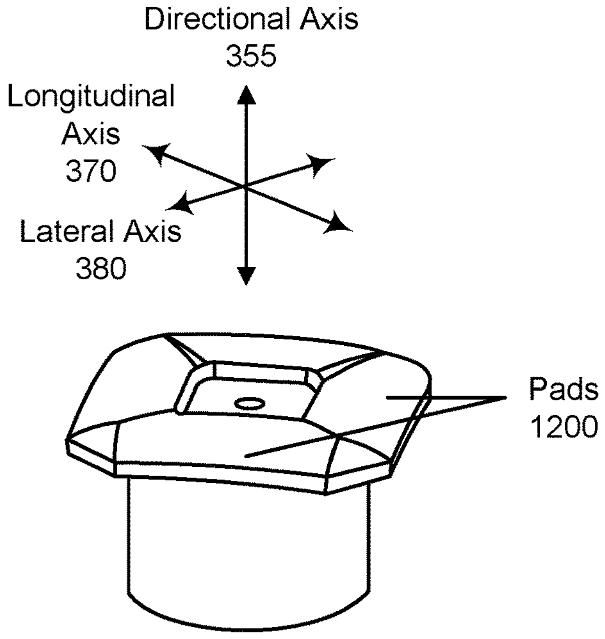
FIG. 12B shows a perspective view of a plunger configuration with pads, in accordance with one embodiment.

FIG. 12A shows a side view of a plunger configuration with pads, in accordance with one embodiment. FIG. 12B shows a perspective view of a plunger configuration with pads, in accordance with one embodiment. FIG. 12A illustrates a four-pad plunger 562 of a force feel mechanism (e.g., the force feel mechanism 420 of FIG. 4). The four-pad plunger 562 may be an embodiment of the plunger 560. In FIG. 12A, the four-pad plunger 562 is illustrated with a single area of contact (e.g., continuous circle of contact) to the plunger actuating plate 540 due to the pads 1200 that form the surface of the four-pad plunger 562. The plunger actuating plate 540 may contact the four-pad plunger 562 at one or more of the four pads 1200. The four-pad plunger 562 is held in azimuth (e.g., where rotation is about the directional axis 155) to ensure the pads 1200 are oriented correctly with respect to the longitudinal axis 370 and lateral axis 380. The four pads 1200 are further shown in FIG. 12B. The pads 1200 are areas of the surface of the four-pad plunger 562 (e.g., at the plunger upper surface plate) that curve downward and are evenly dispersed on the surface. The plunger actuating plate 540 can be shaped to define force feel characteristics. In some embodiments, the surface of the plunger actuating plate 540 is flat. The surface profiles of the pads 1200 can be configured to provide contact with the plunger actuating plate 540 at a radius of action (e.g., the radius at the actuation surface from a pivot point of the plunger actuating plate 540) determined to be the best to achieve a target force feel characteristic. The shape of the pads 1200 in FIG. 12B can cause the radius of action to decrease, increase, or remain constant depending on displacement of the shaft 320. A change in the radius of action can reduce correlation between lateral displacement and longitudinal breakout, longitudinal displacement and lateral breakout, or both.

As deflections of the four-pad plunger 562 increase upon movement of the shaft 320, the plunger actuating plate 540 moves across the four-pad plunger 562 and can remain in contact with two adjacent pads 500 (e.g., contacting only two adjacent pads) on each side of the axis of movement (e.g., lateral axis 380 or longitudinal axis 370). The contact locations between the two of the pads 1200 and the plunger actuating plate 540 may move closer together as the deflection in the axis of movement increases such that the moment required to tilt the shaft 320 in other axis remains constant as force increases due to compression of the four-pad plunger 562.

Figure 13A:
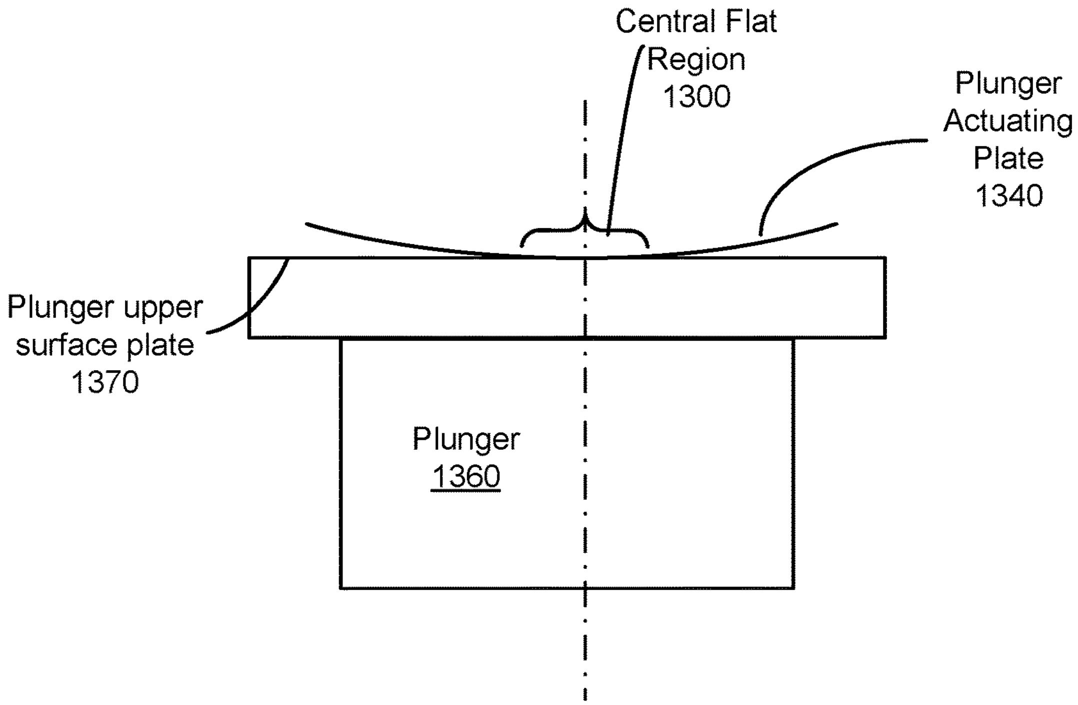
FIG. 13A illustrates contact between a plunger upper surface plate and a curved plunger actuating plate at a central flat region, in accordance with one embodiment.
Figure 13B:
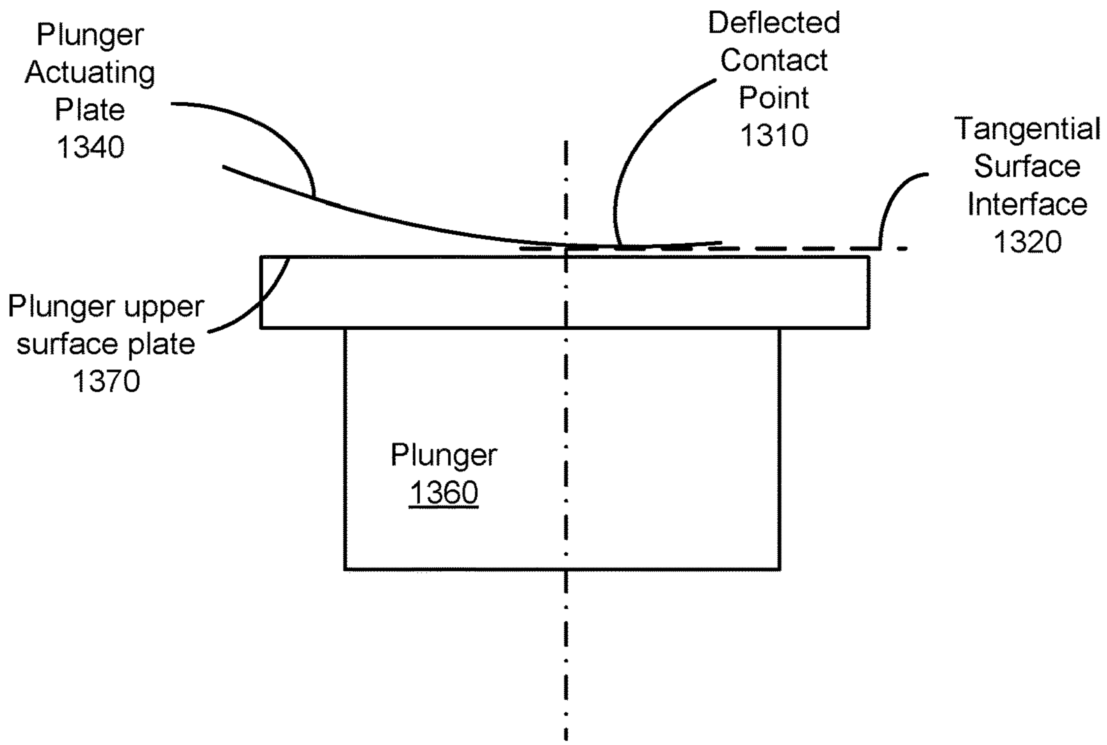
FIG. 13B illustrates contact between a plunger upper surface plate and a curved plunger actuating plate at a tangential surface interface, in accordance with one embodiment.

FIG. 13A illustrates contact between a plunger upper surface plate 1370 and a curved plunger actuating plate 1340 at a central flat region 1300, in accordance with one embodiment. FIG. 13B illustrates contact between a plunger upper surface plate 1370 and a curved plunger actuating plate 1340 at a tangential surface interface, in accordance with one embodiment. FIG. 13A illustrates a side view of the plunger actuating plate 1340 forming a central flat region 1300 against a plunger 1360, according to one or more embodiments. The plunger actuating plate 1340 and plunger 1360 may be an embodiment of the plunger actuating plate 540 and plunger 560 of FIG. 5. As shown in FIG. 13A, the surface of the plunger actuating plate 1340 includes a central flat region 1300 at its center and otherwise curves such that the plunger upper surface plate 1370 is tangent to the plunger actuating plate 1340 (e.g., as shown in FIG. 13B). When the plunger actuating plate 1340 is deflected due to movement of the shaft 320, as shown in FIG. 13B, the surface of the plunger actuating plate 1340 can contact the surface of the plunger 1360 at a deflected contact point 1310 along the tangential surface interface 1320. The plunger actuating plate 1340 may be shaped to include a breakout and, in some embodiments, to produce different longitudinal and lateral force feel characteristics. An example of a breakout shape of a plunger actuating plate is shown in FIG. 14A.

Figure 14A:
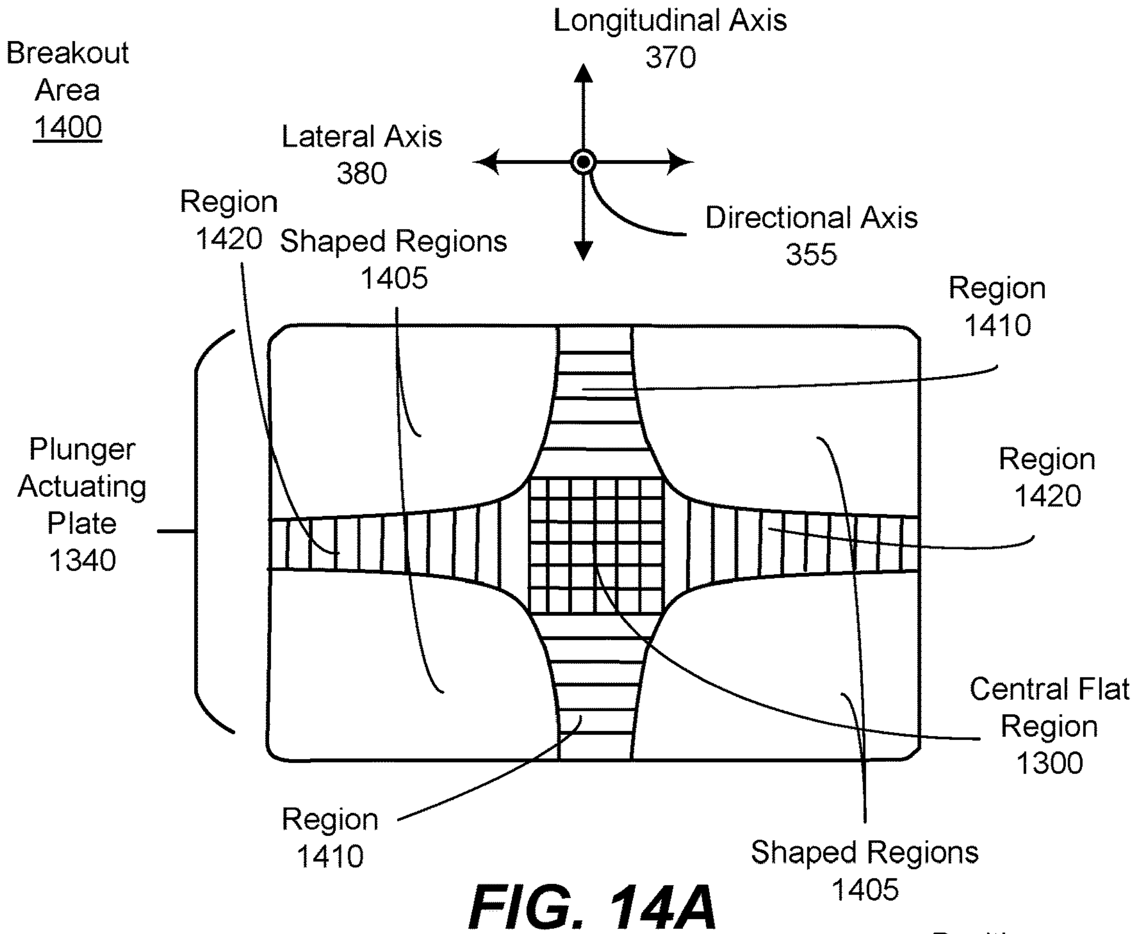
FIG. 14A depicts a bottom view of the curved plunger actuating plate of FIGS. 13A and 13B, in accordance with one embodiment.

FIG. 14A depicts a bottom view of the curved plunger actuating plate 1340 of FIGS. 13A and 13B, in accordance with one embodiment. The bottom of the curved plunger actuating plate 1340 includes the breakout area 1400. The breakout area 1400 includes the central flat region 1300. In FIG. 14A, the central flat region 1300 includes a flat area along a plane formed by two axes along the surface of the plunger actuating plate 1340. Though shown as flat, in some embodiments, the central flat region 1300 may be replaced by a depression or slot for the same effect. In some embodiments, the central flat region 1300 may be a flat depression. The breakout area 1400 also includes regions 1410 and 1420. In some embodiments, the central flat region 1300 and the regions 1410 and 1420 may be machined as slots in the surface of the plunger actuating plate 1340. The regions 1410 and 1420 extend from the central flat region 1300, and the regions 1410 and 1420 are shaped to maintain a constant breakout between the plunger actuating plate 1340 and the plunger 1360. For example, as the operator moves the plunger actuating plate 1340 in the lateral axis 380 and along the region 1420, a force applied to displace the plunger actuating plate 1340 by each degree about the longitudinal axis 370 or corresponding distance along the lateral axis 380, is substantially the same (e.g., each force is within 5-10% Newtons of the other). The central flat region 1300 and regions 1410 and 1420 may be flat along orthogonal axes along the surface of the plunger actuating plate 1340 (e.g., along lines parallel to the longitudinal axis 370 and lateral axis 380 having a pivot point at the gimbal 510, as shown in FIGS. 11A-12B). The respective widths of the regions 1410 and 1420 may narrow as a function of distance from the central flat region 1300. For example, the region 1410 can be flat in the direction of the longitudinal axis 370 and region 1420 can be flat in the direction of the lateral axis 380. The shaped regions 1405 may be smooth, curved surfaces that gradually curve away from the flat areas of the plunger actuating plate 1340. As such, the shaped regions (e.g., 1405) of the plunger actuating plate 1340 are not necessarily in a same plane as the flat areas of the plunger actuating plate 1340. Subsequently, the plunger actuating plate 1340 may have a maximum displacement occurring at the four corners of the plunger actuating plate 1340. In some embodiments, the plunger actuating plate 1340 may be configured to provide a tailored breakout level in one axis dependent on movement in the axis perpendicular to it. For example, the regions 1410 and 1420 may narrow at different rates (e.g., different functions of distance from the central flat region 1300), causing different breakout levels in the different axes.

At the central flat region 1300, the surface of the plunger actuating plate 1340 is flat along both the longitudinal axis 370 and the lateral axis 380 (e.g., the central flat region 1300 is a flat square or any other suitable flat planar shape). Outside of the central flat region 1300, the regions 1410 and 1420 are flat along a direction that the respective region is extending. For example, the region 1420 extends along the lateral axis 380 and is flat along the longitudinal axis 370 (e.g., stepped, flat surfaces that are flat along the longitudinal axis and stepping along the lateral axis). The region 1420 flat along the longitudinal axis may be referred to as a longitudinal flat region. As another example, the region 1410 extends along the longitudinal axis 370 and is flat along the lateral axis 380. The region 1410 flat along the lateral axis may be referred to as a lateral flat region. When the shaft 320 is at a center zero force null position, the flat plunger upper surface plate 1370 of the plunger 1360 pushes up against the central flat region 1300 of the plunger actuating plate 1340, holding the shaft 320 in position (e.g., held by friction within a breakout region). In some embodiments, the magnitude of the force by which the breakout region holds the shaft 320 in position is dependent on the width of the central flat region 1300 and the preload in one or more plunger springs. When an operator moves the mechanical controller 300 in a negative direction about the lateral or longitudinal axis, the breakout region may be dependent on the width of the central flat region 1300 and the spring force of the one or more plunger springs. The spring force of a spring can be dependent on the preload and compression of the spring in response to the actuating plate 1340 applying force to the plunger. As the shaft 320 moves along an axis, the width of the flat area in the direction of the perpendicular axis narrows, reducing the moment arm for the breakout in the perpendicular axis to compensate for the increasing plunger forces away from the center flat portion 1300. For example, as the shaft 320 moves along the longitudinal axis 370, the width of the flat portions of the lateral flat region (flat in the direction of the lateral axis 380) narrows, and the moment arm for breakout in the lateral axis is reduced.

Figure 14B:
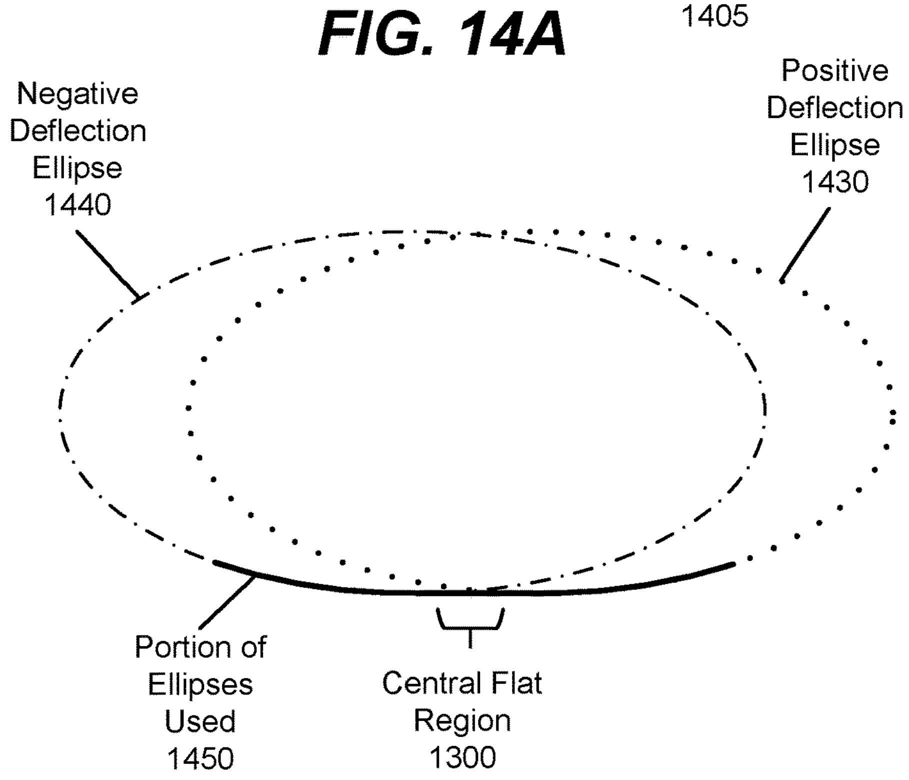
FIG. 14B depicts a surface profile of a length of the curved plunger actuating plate of FIGS. 13A and 13B, in accordance with one embodiment.

FIG. 14B depicts a surface profile of a length of the curved plunger actuating plate of FIGS. 13A and 13B, in accordance with one embodiment. The curve of the plunger actuating plate may be elliptical in shape or any suitable shape that causes the upper surface plate 1370 to form a tangent when in contact with the plunger actuating plate 1340. The surface profile may be determined using two ellipses: a positive deflection ellipse 1430 and a negative deflection ellipse 1440. The ellipses are offset from one another by an offset distance selected to achieve a desired moment to displace the shaft 320 from a neutral position. For example, the moment may be calculated based on the offset of the ellipses and the spring force of the plunger 1360 against the plunger actuating plate 1340.

By offsetting the ellipses from the center of the plunger actuating plate 1340 with a central flat region 1300 in the middle, the ellipses may form a breakout that is the width of the offset, and the surface profile of the length of the plunger actuating plate 1340 may include the portion of the ellipses used 1450. The use of ellipses, rather than circles, can provide more flexibility in defining the shape of the plunger actuating plate 1340. In some embodiments, different longitudinal and lateral force feel characteristics may be desirable, so the longitudinal ellipse shape can be defined differently from the lateral ellipse shape. In addition, different positing and negative shapes can be chosen. The parameters of the ellipses can be tuned to optimize the linearity, or conversely, non-linearity of the force feel characteristics.

Figure 15:
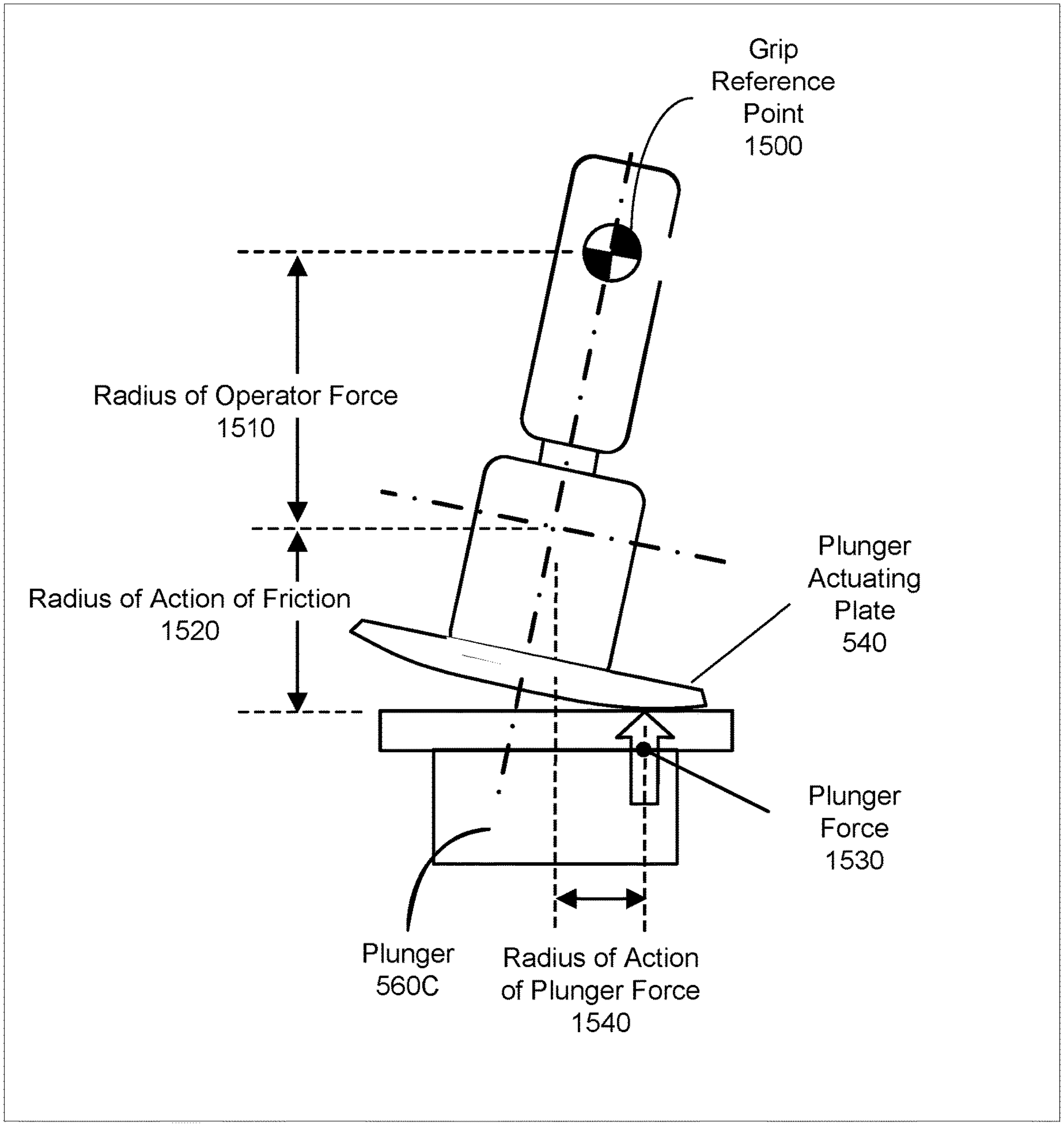
FIG. 15 shows forces between a plunger upper surface plate and a curved plunger actuating plate, in accordance with one embodiment.

FIG. 15 shows forces between the plunger upper surface plate 1370 and the curved plunger actuating plate 1340 of FIG. 13, in accordance with one embodiment. Friction may be a force with a significant influence on the feel of the mechanical controller 300 to an operator. Too much friction can cause a sticky feeling upon moving the mechanical controller 300 and will adversely affect dynamic response of the operator in controlling a vehicle with the mechanical controller 300. If friction is too high at low deflections of the plunger actuating plate 1340, the shaft 320 will not return to the zero force null position when the operator's hands are not controlling its position via the grip 310. For safety, a reliable return to the zero force null position is an important characteristic.

The force balance in the force feel mechanism 420 is such that the coefficient of friction sensed by the operator at the grip reference point 1500 is higher than the actual coefficient of friction at the moving surfaces of the plunger 1360 and plunger actuating plate 1340 since the friction between the surfaces acts approximately normal to the shaft 320 at the radius of the actuation surface from the pivot point of the plunger actuating plate 1340 (e.g., the radius of operator force 1510, radius of action of friction 1520, and/or radius of action of plunger force 1540). Friction on the surfaces is caused by the upward plunger force 1530 that can be offset from the pivot point by a smaller radius than the actuation surface radius. To minimize the friction between the surfaces, low friction treatments may be applied to the surfaces. Examples of low friction treatments include incorporating materials such as Delrin®, PTFE or Tungsten Disulfide (WS2) to the plunger 1360 and/or plunger actuating plate 1340.

Computing Machine Architecture

Figure 16:
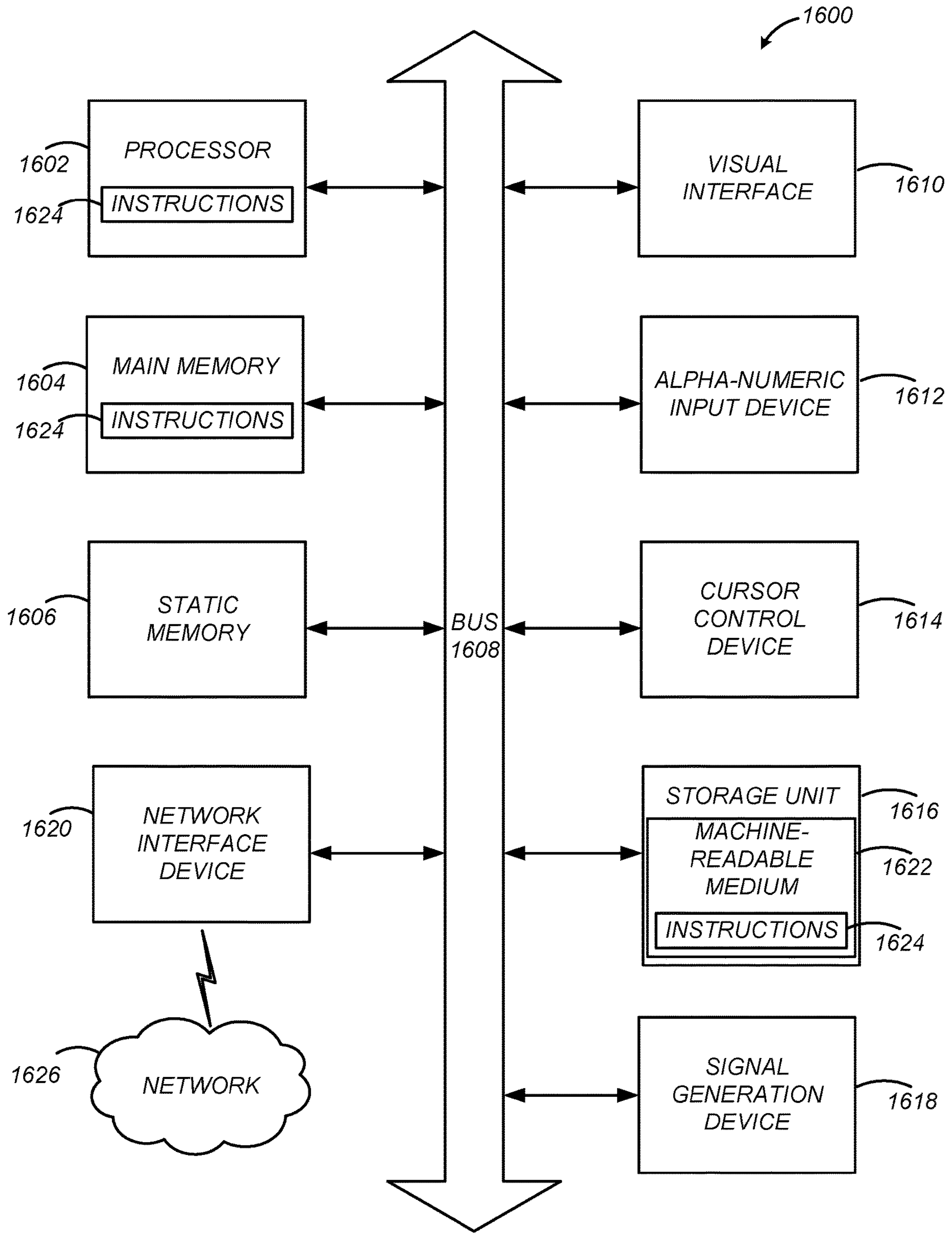
FIG. 16 is a block diagram illustrating components of an example machine able to read instructions from a machine-readable medium and execute them in a processor (or controller).

FIG. 16 is a block diagram illustrating one embodiment of components of an example machine able to read instructions from a machine-readable medium and execute them in a processor (or controller). Specifically, FIG. 16 shows a diagrammatic representation of a machine in the example form of a computer system 1600 within which program code (e.g., software) for causing the machine to perform any one or more of the methodologies discussed herein may be executed. The computer system 1600 may be used for one or more components of the vehicle control and interface system 100 depicted and described in FIG. 1. The program code may be comprised of instructions 1624 executable by one or more processors 1602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 1624 (sequential or otherwise) that specify actions to be taken by that machine. Further, while only a single machine is illustrated, the term "machine" shall also be taken to include any collection of machines that individually or jointly execute instructions 1624 to perform any one or more of the methodologies discussed herein.

The example computer system 1600 includes one or more processors 1602 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 1604, and a static memory 1606, which are configured to communicate with each other via a bus 1608. The computer system 1600 may further include visual display interface 1610. The visual interface may include a software driver that enables (or provide) user interfaces to render on a screen either directly or indirectly. The visual interface 1610 may interface with a touch enabled screen. The computer system 1600 may also include input devices 1612 (e.g., a keyboard a mouse), a storage unit 1616, a signal generation device 1618 (e.g., a microphone and/or speaker), and a network interface device 1620, which also are configured to communicate via the bus 1608.

The storage unit 1616 includes a machine-readable medium 1622 (e.g., magnetic disk or solid-state memory) on which is stored instructions 1624 (e.g., software) embodying any one or more of the methodologies or functions described herein. The instructions 1624 (e.g., software) may also reside, completely or at least partially, within the main memory 1604 or within the processor 1602 (e.g., within a processor's cache memory) during execution.

Example Process for Converting Universal Control Inputs to Vehicle Commands

Figure 17:
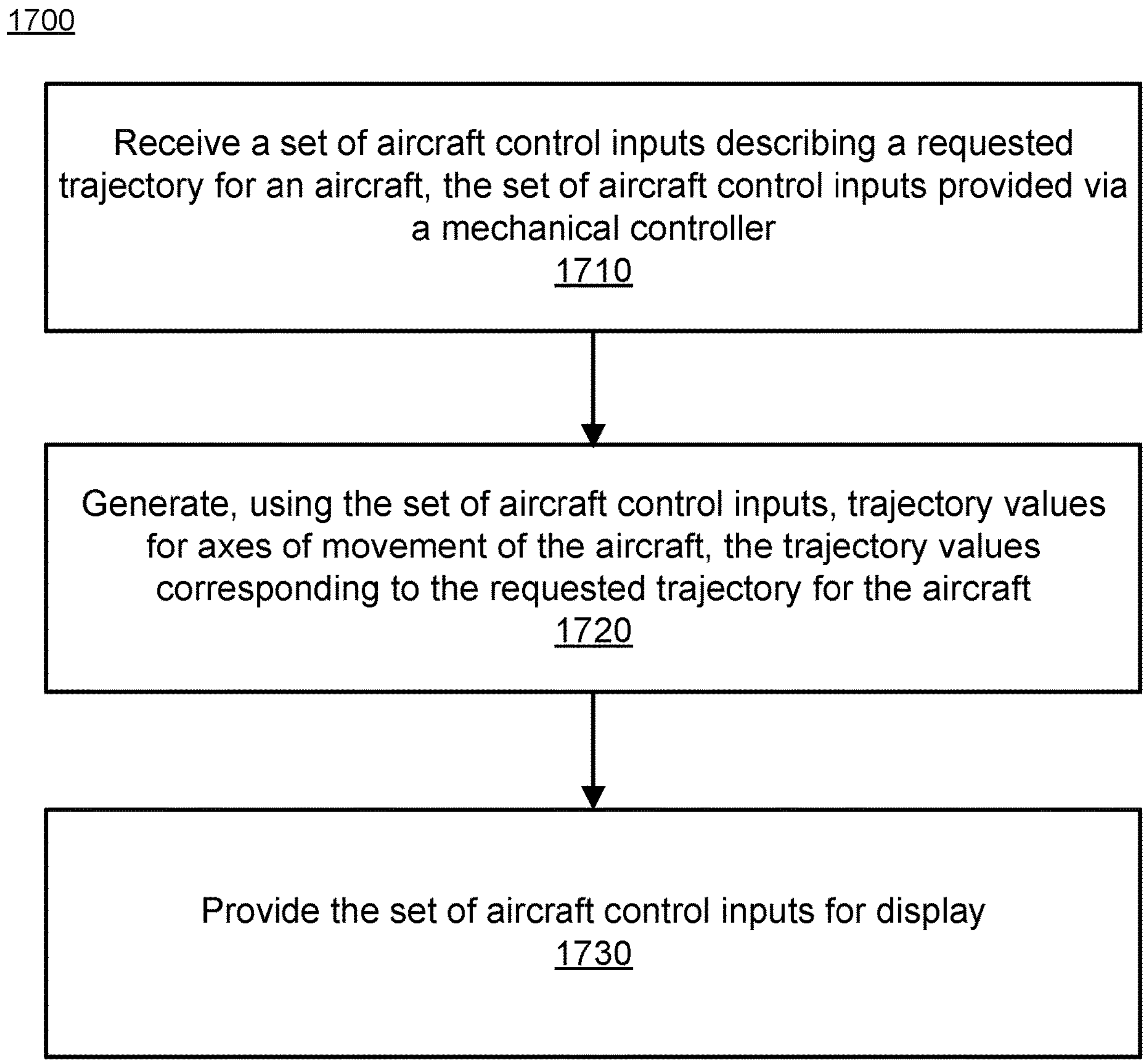
FIG. 17 is a flowchart of a process for generating actuator commands for aircraft control inputs via a mechanical controller, in accordance with one embodiment.

FIG. 17 is a flow diagram illustrating one embodiment of a process 1700 for generating actuator commands for vehicle control inputs via a vehicle control interface (e.g., the universal vehicle control interface 110). In the example embodiment shown, the universal vehicle control interface can perform the operations of the process 1700. However, some or all of the steps may be performed by other entities or components. In addition, some embodiments may perform the steps in parallel, perform the steps in different orders, or perform different steps. Furthermore, the universal vehicle control router may be integrated with one or more computer systems, such as the computer system 1600 described above with reference to FIG. 16.

The universal vehicle control interface receives 1710 a set of aircraft control inputs describing a requested trajectory for an aircraft. The set of aircraft control inputs are provided via a mechanical controller (e.g., the mechanical controller 300 of FIG. 3). For example, a human operator of an aircraft may provide an aircraft control input to control ailerons of the aircraft by moving the mechanical controller left and right. The aircraft control inputs may include one or more of a forward speed control input, a lateral speed control input, a vertical speed control input, a turn control input, or any other suitable movement instruction based on rotational control in the lateral, longitudinal, and directional axis provided by the mechanical controller described herein. The control inputs may also include speed control provided via a fourth-axis input of the mechanical controller (e.g., at the thumbwheel).

The universal vehicle control interface generates 1720, using the aircraft control inputs, trajectory values for axes of movement of the aircraft. The trajectory values may correspond to the requested trajectory. For instance, the aircraft control interface may convert the aircraft control inputs to corresponding trajectory values for axes of movement of the aircraft. As an example, if the aircraft control inputs include some or all of a forward speed control input, a lateral speed control input, a vertical speed control input, or a turn control input, the aircraft control interface may determine one or more of a corresponding aircraft x-axis velocity, aircraft y-axis velocity, aircraft z-axis velocity, or angular velocity about a yaw axis of the vehicle (e.g., a yaw).

The universal vehicle control interface provides 1730 the set of aircraft control inputs for display. For example, the universal vehicle control interface can provide 1730 a value measured by a lateral sensor for display at a different aircraft control interface within the vehicle (e.g., a display screen), displaying a number of degrees offset from zero degrees or an initial position of the mechanical controller. In another example, the universal vehicle control interface provides, for display, a number of degrees deflection of an aileron controlled responsive to an operator's control of the mechanical controller.

Additional Configuration Considerations

The disclosed configurations beneficially provide for a vehicle control and interface system that facilitates universal, simple, and safe mechanisms for vehicle operation. Among other advantages, such mechanisms enable significantly reduced training of human operators for effective operation of vehicles of varying types (e.g., aircraft, motor vehicles, watercraft, etc.). For instance, a human operator can operate a variety of vehicles integrated with the vehicle control and interface system after being trained to operate the vehicle control and interface system once. In contrast, conventional control and interface systems for vehicles require individualized and extensive training processes, often involving a licensing or certification procedures for each type of vehicle.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for universal vehicle control through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A mechanical controller comprising:

a shaft;

a gimbal mechanism including support bearings that hold the shaft, wherein the gimbal mechanism allows displacement of the shaft about a longitudinal axis and a lateral axis;

one or more sensors coupled to the gimbal mechanism, the one or more sensors configured to capture data describing the displacement; and a first force feel mechanism coupled to the gimbal mechanism, the first force feel mechanism comprising:

a plunger coupled to a spring assembly; and a plunger actuating plate configured to contact the plunger, wherein a contact region between the plunger actuating plate and the plunger is shaped such that movement of the shaft about the lateral axis has a first plurality of resistances and movement of the shaft about the longitudinal axis has a second plurality of resistances that is different than the first plurality of resistances, wherein the plunger comprises an upper surface plate configured to contact the plunger actuating plate, and wherein the first plurality of resistances and the second plurality of resistances are based on the shape of the upper surface plate, wherein the shape of the upper surface plate comprises four pads, and wherein the plunger actuating plate contacts a given pair of the four pads at increasingly closer contact points as deflection in the longitudinal axis or the lateral axis increases.

2. The mechanical controller of claim 1, wherein the shaft is enabled to rotate about a directional axis and wherein the gimbal mechanism allows rotation of the shaft about the directional axis.

3. The mechanical controller of claim 2, further comprising a second force feel mechanism included in the gimbal mechanism, wherein the second force feel mechanism enables movement of the shaft about the directional axis to have a third plurality of resistances.

4. The mechanical controller of claim 3, wherein the second force feel mechanism comprises a directional clockwise spring and a directional anti-clockwise spring.

5. The mechanical controller of claim 2, wherein the one or more sensors comprises a lateral axis position sensor, a directional axis position sensor, and a longitudinal axis position sensor.

6. The mechanical controller of claim 1, wherein the plunger actuating plate includes a breakout area comprising:

a central flat region that is flat along the directions of both the longitudinal and lateral axes;

a lateral flat region that is flat along the direction of the lateral axis; and a longitudinal flat region that is flat along the direction of the longitudinal axis.

7. The mechanical controller of claim 1, wherein the plunger actuating plate is treated with a low friction surface treatment.

8. The mechanical controller of claim 1, further comprising:

a grip coupled to the shaft, wherein the grip includes at least one of a thumbwheel or rocker switch; and an enclosure coupled to the grip via the shaft, the enclosure housing at least the shaft, the gimbal mechanism, the one or more sensors, and the first force feel mechanism.

9. The mechanical controller of claim 8, wherein the plunger is located further distally from the grip than the gimbal mechanism is located.

10. The mechanical controller of claim 8, wherein the grip further comprises a presence sensor configured to measure a force applied by a hand upon the grip.

11. The mechanical controller of claim 1, wherein the spring assembly comprises an elastomeric spring.

12. The mechanical controller of claim 1, wherein the gimbal mechanism comprises:

a frame comprising the support bearings; and a support housing coupled to and surrounded by the frame, the shaft located through the support housing.

13. The mechanical controller of claim 12, wherein the support bearings include lateral support bearings and longitudinal support bearings, wherein the lateral support bearings allow the frame to move about the lateral axis, and wherein the longitudinal support bearings allow the support housing to move about the longitudinal axis.

14. The mechanical controller of claim 12, wherein the support housing includes directional support bearings that enable the shaft to rotate about a directional axis.

15. A mechanical controller comprising:

a shaft;

a gimbal mechanism including support bearings that hold the shaft, wherein the gimbal mechanism allows displacement of the shaft about a longitudinal axis and a lateral axis;

one or more sensors coupled to the gimbal mechanism, the one or more sensors configured to capture data describing the displacement; and a first force feel mechanism coupled to the gimbal mechanism, the first force feel mechanism comprising:

a plunger coupled to a spring assembly; and a plunger actuating plate configured to contact the plunger, wherein a contact region between the plunger actuating plate and the plunger is shaped such that movement of the shaft about the lateral axis has a first plurality of resistances and movement of the shaft about the longitudinal axis has a second plurality of resistances that is different than the first plurality of resistances, wherein the plunger actuating plate includes a breakout area comprising:

a central flat region that is flat along the directions of both the longitudinal and lateral axes;

a lateral flat region that is flat along the direction of the lateral axis; and a longitudinal flat region that is flat along the direction of the longitudinal axis, wherein the width of the lateral flat region narrows from proximal to distal from the central flat region, wherein the narrowing width of the lateral flat region reduces a moment arm for the breakout area in the lateral axis.

16. The mechanical controller of claim 15, wherein the plunger comprises an upper surface plate configured to contact the plunger actuating plate, and wherein the first plurality of resistances and the second plurality of resistances are based on the shape of the upper surface plate.

17. The mechanical controller of claim 16, wherein the shape of the upper surface plate comprises four pads, and wherein the plunger actuating plate contacts a given pair of the four pads at increasingly closer contact points as deflection in the longitudinal axis or the lateral axis increases.

18. The mechanical controller of claim 16, wherein the plunger actuating plate curves, and wherein the upper surface plate is tangent to the plunger actuating plate.

19. A mechanical controller comprising:

a shaft;

a gimbal mechanism including support bearings that hold the shaft, wherein the gimbal mechanism allows displacement of the shaft about a longitudinal axis and a lateral axis;

one or more sensors coupled to the gimbal mechanism, the one or more sensors configured to capture data describing the displacement;

a first force feel mechanism coupled to the gimbal mechanism, the first force feel mechanism comprising:

a plunger coupled to a spring assembly; and a plunger actuating plate configured to contact the plunger, wherein a contact region between the plunger actuating plate and the plunger is shaped such that movement of the shaft about the lateral axis has a first plurality of resistances and movement of the shaft about the longitudinal axis has a second plurality of resistances that is different than the first plurality of resistances, wherein the shaft is enabled to rotate about a directional axis and wherein the gimbal mechanism allows rotation of the shaft about the directional axis; and a second force feel mechanism included in the gimbal mechanism, wherein the second force feel mechanism enables movement of the shaft about the directional axis to have a third plurality of resistances, wherein the second force feel mechanism comprises a plurality of leaf spring assemblies associated with the directional axis, wherein each leaf spring assembly is configured to bend when the directional axis is deflected, and wherein each leaf spring assembly comprises an elastomeric layer bonded between a pair of leaf springs.

20. A mechanical controller comprising:

a shaft;

a gimbal mechanism including support bearings that hold the shaft, wherein the gimbal mechanism allows displacement of the shaft about a longitudinal axis and a lateral axis;

one or more sensors coupled to the gimbal mechanism, the one or more sensors configured to capture data describing the displacement; and a first force feel mechanism coupled to the gimbal mechanism, the first force feel mechanism comprising:

a plunger coupled to a spring assembly; and a plunger actuating plate configured to contact the plunger, wherein a contact region between the plunger actuating plate and the plunger is shaped such that movement of the shaft about the lateral axis has a first plurality of resistances and movement of the shaft about the longitudinal axis has a second plurality of resistances that is different than the first plurality of resistances, wherein the plunger comprises an upper surface plate configured to contact the plunger actuating plate, and wherein the first plurality of resistances and the second plurality of resistances are based on the shape of the upper surface plate, wherein the shape of the upper surface plate comprises four pips, wherein the plunger actuating plate in a steady state contacts the four pips, and wherein the plunger actuating plate contacts a given pair of the four pips when the shaft is moved about the longitudinal axis or the lateral axis.

* * * * *